United States Patent
Knight et al.

(10) Patent No.: US 10,700,583 B2
(45) Date of Patent: Jun. 30, 2020

(54) INDUCTION MACHINE WITH INTEGRATED MAGNETIC GEAR AND RELATED METHODS

(71) Applicant: UTI Limited Partnership, Calgary (CA)

(72) Inventors: Andrew Michael Knight, Calgary (CA); Dalia Zaky Bassuny Abdelhamid, Calgary (CA)

(73) Assignee: UTI LIMITED PARTNERSHIP, Calgary (CA)

( * ) Notice: Subject to any disclaimer, the term of this patent is extended or adjusted under 35 U.S.C. 154(b) by 252 days.

(21) Appl. No.: 15/692,686

(22) Filed: Aug. 31, 2017

(65) Prior Publication Data

US 2018/0062490 A1    Mar. 1, 2018

Related U.S. Application Data

(60) Provisional application No. 62/381,827, filed on Aug. 31, 2016.

(51) Int. Cl.
*H02K 17/32* (2006.01)
*H02K 49/10* (2006.01)
(Continued)

(52) U.S. Cl.
CPC ............. *H02K 17/32* (2013.01); *H02K 1/02* (2013.01); *H02K 1/16* (2013.01); *H02K 7/11* (2013.01);
(Continued)

(58) Field of Classification Search
CPC ........ H02K 17/32; H02K 17/16; H02K 17/26; H02K 1/02; H02K 1/16; H02K 7/116;
(Continued)

(56) References Cited

U.S. PATENT DOCUMENTS 4,945,296 A * 7/1990 Satake .................. H02K 16/04
310/112
9,166,464 B2 * 10/2015 Mita .................... H02K 49/108
(Continued)

OTHER PUBLICATIONS

Atallah et al., "Design, Analysis and Realisation of a High Performance Magnetic Gear," IEE Proceedings—Electric Power Applications, Mar. 2004, vol. 151 (2), pp. 135-143.
(Continued)

*Primary Examiner* — Emily P Pham
(74) *Attorney, Agent, or Firm* — Borden Ladner Gervais LLP; Louis B. Allard

(57) ABSTRACT

An induction machine with integrated magnetic gears is disclosed. The machine comprises two rotors and two stators. An outer stator has ferromagnetic material, producing a rotating magnetic field with a defined number of pole pairs synchronized with a supply frequency. A high speed rotor has ferromagnetic material and a combination of rotor bars and permanent magnet pole pieces selected so that the permanent magnet pole pieces do not interact with the outer stator magnetic field. The high speed rotor rotation is asynchronously coupled to the outer stator magnetic field. An inner stator has ferromagnetic steel segments that modulate the field produced by the high speed rotor permanent magnets. A low speed inner rotor has ferromagnetic material and permanent magnet pole pieces, the low speed inner rotor counter-rotating to the high speed rotor. The low speed inner rotor is synchronously coupled to the high speed rotor using modulation harmonics.

17 Claims, 15 Drawing Sheets

(51) Int. Cl.
| | |
|---|---|
| *H02K 1/02* | (2006.01) |
| *H02K 1/16* | (2006.01) |
| *H02K 7/116* | (2006.01) |
| *H02K 17/16* | (2006.01) |
| *H02K 7/11* | (2006.01) |
| *H02K 16/02* | (2006.01) |
| *H02K 17/26* | (2006.01) |

(52) U.S. Cl.
CPC ............ *H02K 7/116* (2013.01); *H02K 16/02* (2013.01); *H02K 17/16* (2013.01); *H02K 49/102* (2013.01); *H02K 17/26* (2013.01); *H02K 2213/03* (2013.01); *Y02E 10/725* (2013.01)

(58) Field of Classification Search
CPC . H02K 7/16; H02K 7/11; H02K 16/02; H02K 2213/03; Y02E 10/725
See application file for complete search history.

(56) References Cited

U.S. PATENT DOCUMENTS

| | | | | |
|---|---|---|---|---|
| 9,729,040 | B2* | 8/2017 | Sutani | H02K 49/102 |
| 9,923,440 | B2* | 3/2018 | Finkle | H02K 21/46 |
| 2006/0012259 | A1* | 1/2006 | Kerlin | H02K 3/12 |
| | | | | 310/166 |
| 2007/0090707 | A1* | 4/2007 | Moriya | B60K 6/26 |
| | | | | 310/113 |
| 2010/0219706 | A1* | 9/2010 | Watanabe | B60W 20/30 |
| | | | | 310/107 |
| 2011/0115326 | A1* | 5/2011 | Clark | H02K 7/11 |
| | | | | 310/114 |
| 2011/0127869 | A1* | 6/2011 | Atallah | H02K 49/06 |
| | | | | 310/94 |
| 2011/0156518 | A1* | 6/2011 | Bright | H02K 19/106 |
| | | | | 310/103 |
| 2011/0163623 | A1* | 7/2011 | Rens | H02K 7/11 |
| | | | | 310/114 |
| 2013/0093276 | A1* | 4/2013 | Kim | H02K 16/00 |
| | | | | 310/114 |
| 2015/0037180 | A1* | 2/2015 | Abbott | H02K 49/102 |
| | | | | 417/420 |
| 2015/0069875 | A1* | 3/2015 | Lipo | H02K 21/12 |
| | | | | 310/156.35 |
| 2015/0207377 | A1* | 7/2015 | Linares | H02K 16/005 |
| | | | | 310/121 |
| 2017/0025977 | A1* | 1/2017 | Armstrong | B60L 1/00 |

OTHER PUBLICATIONS

Atallah et al., "A New PM Machine Topology for Low-speed, High-Torque Drives," 18th International Conference on Electrical Machines, Sep. 2008, pp. 1-4.

Atallah et al., "A Novel High-Performance Magnetic Gear," IEEE Transactions on Magnetics, Jul. 2001, vol. 37 (4), pp. 2844-2846.

Atallah et al., "A Novel Pseudo Direct-drive Brushless Permanent Magnet Machine," IEEE Transactions on Magnetics, Nov. 2008, vol. 44 (11), pp. 4349-4352.

Bouheraoua et al., "Influence of Control Structures and Load Parameters on Performance of a Pseudo Direct Drive," Machines, 2014, vol. 2 (3), pp. 158-175.

Chau et al., "Design of a Magnetic-Geared Outer-Rotor Permanent-Magnet Brushless Motor for Electric Vehicles," IEEE Transactions on Magnetics, Jun. 2007, vol. 43 (6), pp. 2504-2506.

El-Rafaie et al., "Comparison of Induction Machine Performance with Distributed and Fractional-Slot Concentrated Windings," IEEE Industry Applications Society Annual Meeting, Oct. 2008, pp. 1-8.

Frandsen et al., "Loss investigation of Motor Integrated Permanent Magnet Gear," 17th International Conference on Electrical Machines and Systems (ICEMS), Oct. 2014, pp. 2673-2679.

Frank et al., "Analysis of the Concentric Planetary Magnetic Gear with Strengthened Stator and Interior Permanent Magnet Inner Rotor," IEEE Transactions on Industry Applications, Jul.-Aug. 2011, vol. 47 (4), pp. 1652-1660.

Frank et al., "Gearing Ratios of a Magnetic Gear for Wind Turbines," Electric Machines and Drives Conference, 2009. IEMDC '09. IEEE International, May 2009, pp. 1224-1230.

Lewis., "The Advanced Induction Motor," Power Engineering Society Summer Meeting, 2002 IEEE, 2002, vol. 1, pp. 250-253.

Mathe et al., "Motor Integrated Permanent Magnet Gear in a Battery Electrical Vehicle," IEEE Transactions on Industry Applications, Mar.-Apr. 2015, vol. 51 (2), pp. 1516-1525.

Mezani et al., "Magnetically Geared Induction Machines," IEEE Transactions on Magnetics, Nov. 2015, vol. 51(11), 4 pages.

Penzkofer et al., "Magnetic Gears for High Torque Applications," IEEE Transactions on Magnetics, Nov. 2014, vol. 50 (11), pp. 1-4.

Rasmussen et al., "Development of a High-Performance Magnetic Gear," IEEE Transactions on Industry Applications, May-Jun. 2005, vol. 41 (3), pp. 764-770.

Spinato et al., "Reliability of Wind Turbine Subassemblies," IET Renewable Power Generation, Dec. 2009, vol. 3 (4), pp. 387-401.

Uppalapati et al., "Construction of a Low Speed Flux Focusing Magnetic Gear," Energy Conversion Congress and Exposition (ECCE), Sep. 2013, pp. 2178-2184.

Zhang et al., "Permanent Magnet Eddy Current Loss Analysis of a Novel Motor Integrated Permanent Magnet Gear," IEEE Transactions on Magnetics, Nov. 2012, vol. 48 (11), pp. 3005-3008.

* cited by examiner

INDUCTION MACHINE WITH INTEGRATED MAGNETIC GEAR AND RELATED METHODS

FIELD

The present disclosure relates generally to induction machines and magnetic gears and, in particular, to induction machines with magnetic gears integrated therein and to methods related thereto.

BACKGROUND

Gears are commonly used when machines fail to meet load torque or speed requirements. Mechanical gearboxes are widely used to match the prime-movers' operating speeds to the requirements of their loads, both for increasing the rotational speed (e.g., wind turbine generators) or decreasing the speed (e.g., electric-ship propulsion). It is usually more cost and weight effective to employ a high-speed electrical machine together with a gearbox to transform speed and torque than to build a machine to operate at a desired speed. Although high torque densities can be achieved with mechanical gearboxes, there are many concerns about their operation such as acoustic noise, mechanical vibration, need for lubrication, reliability concerns, and maintenance requirements.

One solution to some of the above issues is to employ a gearbox using magnetic gearing in which the rotational forces, or torques, are transmitted across an airgap through the interaction of magnetic fields [1]. Magnetic gears avoid problems associated with traditional mechanical gears. Magnetic gears do not have contacting surfaces, or engaging teeth, and do not require transmission fluids. A further benefit is that magnetic gears have concentric rotating shafts and forces within them tend to be more balanced, relieving the stress on the bearings and thus allowing for significant improvements in bearing longevity. The magnetic gear system is therefore robust and highly reliable. Magnetic gears also eliminate friction losses due to contacting teeth and are highly efficient.

Magnetic gears transmit torque without contact by different magnetic poles through flux modulating pieces. Since the torque transmission occurs without any contact, magnetic gears have high efficiency, low noise, less vibrations and improved reliability. Furthermore, for higher power ratings, magnetic gears are smaller and lighter than mechanical gears and have inherent overload protection. In case of overload, the magnetic gear slips and when the fault is cleared, it reengages safely. Magnetic gears significantly reduce harmful drivetrain pulsations, which cause misalignment/vibration of shafts. Torque densities, typically in the range 40-80 kNm/m, can be achieved with high efficiency [1-9].

Low-speed high-torque electrical machines have many applications. In order to have low-speed and high-torque from an electrical machine, the machine can be designed to operate at a desired speed or the machine output can be geared to the desired speed. Satisfying the load requirements needs to be done with efficiency, low cost, minimal size and simplicity. Since the machine size is directly proportional with the torque, high torque machine are generally large. Direct drive machines at high torques are often not feasible due to size and mass [14-17].

A magnetic gear integrated with a permanent magnet (PM) motor has been developed for a number of applications. Due to its high torque density, PM machines were integrated with magnetic gears and resulted in a high-torque low-speed drive which eliminates the mechanical gearbox with all of its related concerns. It has high reliability, low maintenance, low cooling requirements, inherent torque overload protection and low NVH (Noise, Vibration, and Harshness) [3-9]. PM machines integrated with magnetic gears have been used in many applications such as electric vehicle traction, wind turbines, ship propulsion systems, aerospace actuation, and industrial applications that require a high-torque, low-speed drive [1-9, 14, 16, 17].

There are a number of applications where high torque, low speed characteristics are required but the industrial system to be driven is well suited to an induction machine drive. Examples may include systems having a long cable or an isolation transformer between the drive and motor, or systems which exhibit significant backlash, windup or potential for jamming. In these cases, PM systems are not suitable and induction machines with integrated magnetic gear would be a better fit.

Although PM machines can be made with very high torque densities and high pole numbers (for low speed operation), induction machines offer simplified open loop control or simple 'sensorless' closed loop control, lower cost, can be used with systems with long cables requiring isolation or filtering, and are also suitable for systems with significant backlash, windup or potential to jam.

However, the combination of induction machines with magnetic gears is not straightforward. PM machines and magnetic gears are both synchronous. Induction machines are asynchronous and therefore not easily combinable with synchronous magnetic gears.

One example of a PM machine with magnetic gears is disclosed in PCT Publication WO2011/144895 (Large magnetically geared machines). This application discusses a PM machine integrated with magnetic gear, integrating two synchronous machines. The application provides an electrical machine comprising a first rotor, wherein the first rotor includes a support structure, a second rotor, and a stator. The first rotor, second rotor, and stator are arranged concentrically about a shaft, and at least one of the second rotor and the stator accommodates the support structure. It is designed for use in energy generation or propulsion. This system does not incorporate an induction machine with integrated magnetic gearing.

A further example of a PM machine with magnetic gears is disclosed in U.S. Pat. No. 8,968,042 (Electric marine propulsion device with integral magnetic gearing). This patent discloses a propulsion device comprising an electrical machine with integral magnetic gearing, which comprises three members, namely a first or inner rotor comprising a first plurality of permanent magnets, a second rotor in the form of a plurality of ferromagnetic pole pieces, and a stator which is associated with a plurality of 3-phase windings and to the periphery of which a plurality of second permanent magnets are fixed. This patent uses a PM machine. The patent provides a list of machines that may be used in the integration with magnetic gears but it doesn't provide any disclosure of how to combine asynchronous machines with the synchronous magnetic gears.

Another PM machine system with integrated magnetic gears is disclosed in US Publication No. 2011/0012458 (Magnetic drive systems). This application discloses a PM machine integrated with magnetic gear. It has one set of PMs and the windings are put on the stator combining the two stators with each other, resulting in a one stator configuration. The main focus of this prior application is the design and support of ferromagnetic pole pieces within the system. Again, this system integrates two synchronous machines.

A further example of a PM machine with integrated magnetic gears is disclosed in U.S. Pat. No. 8,358,044 (Electric machine apparatus with integrated, high torque density magnetic gearing). This patent shows a flux modulated PM machine with two stators and one rotor. It shows two configurations but again, it integrates two synchronous machines.

An example of a hybrid induction machine with magnetic gears is shown in Mezani et al., "Magnetically Geared Induction Machines", in Magnetics, IEEE Transactions, vol 51, no. 11, pp 4-8, June 2015. This paper describes a method of coupling a wound rotor induction machine to a magnetic gear to achieve a high torque density drive system. It uses 3-phase windings to increase the torque transmission capabilities of the system. This allows more operational flexibility compared to magnetically geared PM machines. It also uses ferromagnetic pieces in designing the magnetic gear and a multi-phase winding arrangement. Mezani uses a design which incorporates one stator and two rotors. The arrangement described in this paper requires additional direct current (DC) boost windings and additional three phase rotating diode rectifier. This means that the system is not a fully integrated induction machine with integrated magnetic gears, but is a hybrid induction and synchronous machine with magnetic gear. Finally, the design does not allow for optimization of the parameters in the system. These parameters affect the efficiency and operation of the integrated magnetic gear, and also torque density values.

Presently, there are limited options for low speed drives that use induction machines without using mechanical gearboxes, which can be a major point of failure, for example, in Type-3 wind turbines [10]. It would be advantageous to develop an induction machine that is fully integrated with internal magnetic gears for the ability to have a high torque low speed machine.

SUMMARY

It is an object of the present disclosure to obviate or mitigate at least one disadvantage of previous systems.

It has now been found to be possible to integrate (both magnetically and mechanically) magnetic gears with an induction machine such as a motor or generator. The term 'pseudo' direct drive (PDD) may be used herein to describe a mechanically and magnetically coupled electrical machine and magnetic gear arrangement with high-torque density and low-speed capabilities. This arrangement allows a more compact combined unit than a separate magnetic gear and PM motor or generator. In one aspect, the present system can magnetically generate a very high torque at low speed, allowing direct drive (without gearbox) without incurring a significant mass or volume loss.

The present disclosure implements an induction machine integrated with a magnetic gear as a solution for a number of industrial applications that may necessitate high torque, low speed drive such as electric vehicles, wind turbines, ship propulsion systems, drillers and crushers. The present disclosure relates to a design and method of integrating a magnetic gear into an induction machine system, in order to produce an asynchronous rotor motion at low speed and high torque density. This may be used with a grid connection or open loop control.

In one aspect, the present system is a pseudo direct drive magnetic machine system, comprising:
a. an outer stator comprising ferromagnetic material, and ac windings placed in stator slots, for producing a rotating magnetic field with a defined number of pole pairs that is synchronized with a supply frequency;
b. a high speed rotor, positioned within the outer stator, comprising ferromagnetic material, and a combination of rotor bars and permanent magnet pole pieces, wherein the combination of rotor bar numbers, pole pairs and permanent magnet pole pieces is such that the permanent magnet pole pieces do not interact with the outer stator magnetic field and wherein the high speed rotor rotation is asynchronously coupled to the outer stator magnetic field;
c. an inner stator with ferromagnetic steel segments that modulate the field produced by the high speed rotor permanent magnets;
d. a low speed inner rotor comprising ferromagnetic material and permanent magnet pole pieces; the low speed inner rotor counter-rotating to the high speed rotor;
wherein the low speed inner rotor is synchronously coupled to the high speed rotor using modulation harmonics; and
wherein the combination of modulating ferromagnetic steel segments on the inner stator and number of permanent magnet pole pieces on the high speed and low speed rotors provide the desired magnetic gearing between high speed and low speed rotors.

In a further aspect, the present disclosure provides a method of optimizing the parameters in the system for achieving desired performance and efficiency of the integrated system. The equation:

$$\tau = \frac{p_L \pi r l g M_H \prod_o M_L \prod_1}{4\mu_o} \sin p_L \alpha. \tag{12}$$

where r is the machine radius, l is the core length and g is the air gap length, can be used to design the induction machine system with integrated magnetic gear and determine the number of poles in each rotor and machine dimensions.

In a further aspect, the present disclosure provides a method of determining the number of ring pieces and machine dimensions for an induction machine integrated with magnetic gear, comprising:
a. providing operating conditions of a machine, wherein the operating conditions are selected from the required speed and torque,
b. providing an induction machine with internal magnetic gear having two stators and two rotors, wherein the rotors include a high speed rotor and a low speed rotor,
c. determining a combination of rotor bar numbers, pole pairs and permanent magnet pole pieces and a combination of modulating segments and number of permanent magnet pole pieces on the high speed roto and the low speed rotor are selected in accordance with an equation comprising:

$$\tau = \frac{p_L \pi r l g M_H \prod_o M_L \prod_1}{4\mu_o} \sin p_L \alpha. \tag{12}$$

wherein r is the machine radius, l is the core length, g is the air gap length; p is the number of poles and ω is the rotational speeds, subscripts "H" "L" and "S" denote high speed rotor and low speed rotor magnet pieces and modulating ring respectively; and d. incorporating the determined combinations into the two stators and two rotors.

In a further aspect, the present disclosure provides a method of integrating an induction machine with a magnetic gear, comprising a. providing an induction machine with internal magnetic gear having two stators and two rotors, wherein the two rotors comprise a high speed rotor and a low speed rotor, b. determining the number of ring pieces and machine dimensions comprising the steps of:

c. providing operating conditions of a machine, wherein the operating conditions are selected from the required speed and torque, determining a combination of rotor bar numbers, pole pairs and permanent magnet pole pieces and a combination of modulating segments and number of permanent magnet pole pieces on the high speed roto and the low speed rotor are selected in accordance with an equation comprising:

$$\tau = \frac{p_L \pi r l g M_H \prod_o M_L \prod_1}{4\mu_o} \sin p_L \alpha. \quad (12)$$

wherein r is the machine radius, l is the core length, g is the air gap length; p is the number of poles and w is the rotational speeds, subscripts "H" "L" and "S" denote high speed rotor and low speed rotor magnet pieces and modulating ring respectively;

d. incorporating the determined combinations into the two stators and two rotors; and e. integrating the induction machine with the magnetic gears to achieve the desired operating conditions.

In another aspect, the present disclosure provides an induction machine with integrated magnetic gears, comprising: an outer stator defining stator slots and having a plurality of pole pairs, the outer stator comprising AC windings located in the stator slots, the AC windings being operationally connected to a power supply operating at a supply frequency, the outer stator for producing a rotating magnetic field synchronized with the supply frequency. The induction machine further comprises a high speed rotor positioned within the outer stator, the high speed rotor comprising a combination of rotor bars and permanent magnet pole pieces, the combination of rotor bars, pole pairs and permanent magnet pole pieces being configured for the permanent magnet pole pieces to not interact with the outer stator magnetic field, a rotation of the high speed rotor being asynchronously coupled to the outer stator rotating magnetic field, the high speed rotor generating a magnetic field; an inner stator with ferromagnetic steel segments that modulate the magnetic field produced by the high speed rotor permanent magnets; and a low speed inner rotor comprising other permanent magnet pole pieces, the low speed inner rotor being configured to counter rotate with respect to the high speed rotor. The outer stator, the high speed rotor and the low speed inner rotor each comprise a respective ferromagnetic material. The high speed rotor, low speed inner rotor, outer stator and inner stator are arranged concentrically about a shaft. The low speed inner rotor being synchronously coupled to the high speed rotor using modulation harmonics. And, the combination of the ferromagnetic segments, the permanent magnet pole pieces of the high speed rotor and the other permanent pole pieces on the low speed inner rotor providing a magnetic gearing between the high speed rotor and the low speed rotor.

In yet another aspect, the present disclosure provides a method of determining the number of ring pieces and machine dimensions for an induction machine integrated with magnetic gears, the induction machine having two stators and two rotors. The method comprises steps of:

a. providing speed and torque operating conditions for an induction machine integrated with magnetic gears; and, b. determining operational parameters for the two stators and two rotors in accordance with an equation comprising:

$$\tau = \frac{p_L \pi r l g M_H \prod_o M_L \prod_1}{4\mu_o} \sin p_L \alpha.$$

wherein r is the machine radius, l is the core length, g is the air gap length, p is the number of permanent pole pieces and subscripts "H" "L" and "S" denote high speed rotor and low speed rotor magnet pieces and modulating ring respectively;

wherein the operational parameters are a combination of rotor bar numbers, pole pairs and permanent magnet pole pieces, the other permanent pole pieces and the ferromagnetic steel segments; and, wherein the rotors include a high speed rotor and a low speed rotor.

In a further aspect, the present disclosure provides a method of determining the number of ring pieces and machine dimensions for an induction machine integrated with magnetic gears, the induction machine having two stators and two rotors. The method comprises steps of:

c. providing speed and torque operating conditions for an induction machine integrated with magnetic gears; and, d. determining operational parameters for the two stators and two rotors in accordance with an equation comprising:

$$\tau = \frac{p_L \pi r l g M_H \prod_o M_L \prod_1}{4\mu_o} \sin p_L \alpha.$$

wherein r is the machine radius, l is the core length, g is the air gap length, p is the number of permanent pole pieces and subscripts "H" "L" and "S" denote high speed rotor and low speed rotor magnet pieces and modulating ring respectively;

wherein the operational parameters are a combination of rotor bar numbers, pole pairs and permanent magnet pole pieces, the other permanent pole pieces and the ferromagnetic steel segments; and, wherein the rotors include a high speed rotor and a low speed rotor.

In yet another aspect, the present disclosure provides a method of integrating an induction machine with magnetic gears, the induction machine having two stators and two rotors. The method comprising steps of:

a. determining the number of ring pieces and machine dimensions comprising:

i. providing speed and torque operating conditions for an induction machine integrated with magnetic gear; and, ii. determining operational parameters for the two stators and two rotors in accordance with an equation comprising:

$$\tau = \frac{p_L \pi r l g M_H \prod_o M_L \prod_1}{4\mu_o} \sin p_L \alpha.$$

wherein r is the machine radius, l is the core length, g is the air gap length, p is the number of permanent pole pieces and subscripts "H" "L" and "S" denote high speed rotor and low speed rotor magnet pieces and modulating ring respectively and the operational parameters are a combination of rotor bar numbers, pole pairs and permanent magnet pole pieces, the other permanent pole pieces and the ferromagnetic steel segments; and, b. integrating the induction machine with the magnetic gears using the operational parameters;

wherein the two rotors comprise a high speed rotor and a low speed rotor,

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Figure 1:
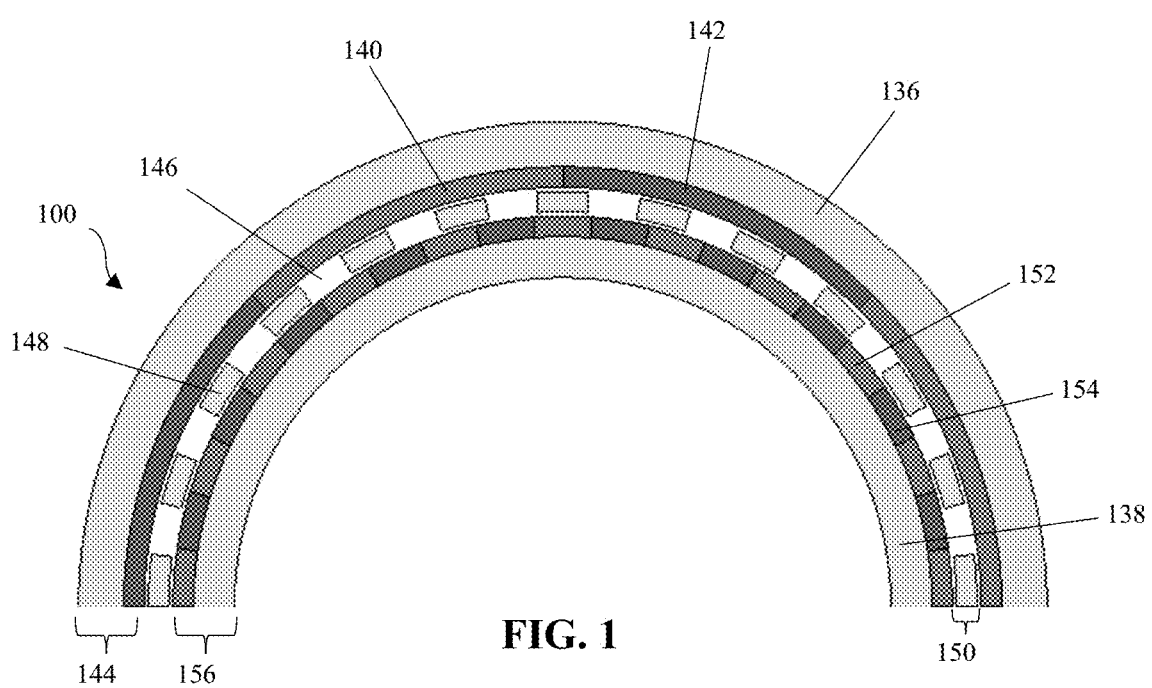
FIG. 1 is a schematic of an example of a section of a 21-4 magnetic gear where only a top half is shown.

In order to benefit from induction machine and magnetic gear specifications and to find a suitable electrical drive for applications where a PM machine may not be the best fit, the integration and optimization of an induction machine with a magnetic gear is disclosed. Potential applications for this machine includes replacement of hydraulic drives such as in oilfield applications, and drilling motors, or in other applications such as crushers or wind generation, where high-torque and low-speed mechanical characteristics are desired.

The present system integrates the asynchronous induction machine with the synchronous magnetic gears. It produces a system where the parameters of the pole pairs of the rotors in the system can be optimized to achieve a desired output.

The general structure of the present system incorporates two rotors and two stators.

The outer stator includes ferromagnetic material and a multiphase with ac winding placed in stator slots. It produces a rotating magnetic field with a defined number of pole pairs that is synchronized with a supply frequency.

A high speed rotor is positioned within the outer stator. The high speed rotor includes ferromagnetic material and a combination of rotor bars and permanent magnet pole pieces. The combination of rotor bar numbers, pole pairs and permanent magnet pole pieces is selected so that the permanent magnet pole pieces do not interact with the outer stator magnetic field and the high speed rotor rotation is asynchronously coupled to the outer stator magnetic field.

An inner stator includes ferromagnetic steel segments that modulate the field produced by the high speed rotor permanent magnets.

A low speed inner rotor includes ferromagnetic material and permanent magnet pole pieces. The low speed inner rotor counter-rotates to the high speed rotor. The low speed inner rotor is synchronously coupled to the high speed rotor using modulation harmonics.

The combination of modulating segments and the number of permanent magnet pole pieces on the high speed and low speed rotors provide a desired magnetic gearing between high speed and low speed rotors.

The desired magnetic gearing can be selected taking into account the required performance for and application of the system. For example, by determining the speed ratio, gear ratio and/or torque required for a particular application, the system can be designed with the required number of poles and combinations of modulating segments, pole pieces, and ratios of poles on the high and low speed rotors, and other factors to provide the desired performance. When simulations are run using commercially available simulation software, the performance of the system can be seen and the parameters of the system changed to optimize the performance for the desired application.

Selection of Number of Poles and Machine Dimension

Illustratively speaking, to design the integrated system and determine the number of poles in each rotor and the machine dimensions, a torque calculation has been derived. Due to limitations of the potential application, the design uses an outer stator and inner high torque rotor. For this reason, a concentric radial flux gear with stationary modulating ring was chosen.

In order to design a magnetic gear, the gear ratio and the torque relationships are briefly reviewed. The relationship between the number of poles, p, and the rotational speeds, ω are theoretically given by:

$$N_s = |p_L + p_H| \quad (1)$$

$$\omega_s N_s = \omega_L p_L + \omega_H p_H \quad (2)$$

where subscripts "H" "L" and "S" denote high speed rotor and low speed rotor magnet pieces and modulating ring respectively. With reference to FIG. 1, outer north and south pole magnet pieces 140 and 142 denote high speed outer rotor magnet pieces; inner north and south pole magnet piece 152 and 154 denote low speed inner rotor magnet pieces; and a modulating ring magnet piece is shown at 148. In this illustrative example, the modulating ring 150, also referred to as an inner stator, is stationary, giving a gear ratio, G, of:

$$G = \frac{p_L}{p_H} \quad (3)$$

In this system, the inner 156 and outer rotors 144 are counter-rotating.

To explain the torque production, one can consider the interactions between the mmf (magnetomotive force) and permeance harmonics as they produce a set of flux density harmonics. The flux density harmonics can be used to calculate torque density harmonics and resulting torque harmonics.

The mmf equation for high speed rotor 144 and low speed rotor 156 are given by equations (4) and (5) respectively:

$$M_H = \Sigma_{i=1}^{\infty} M_i \cos(p_H \theta_i - \omega_{Hi} t) \quad (4)$$

$$M_L = \Sigma_{j=1}^{\infty} M_h \cos(p_L \theta_j - \omega_{Lj} t) \quad (5)$$

The permeance of the modulating ring may also be described using Fourier series and is given by (6).

$$\Pi = \Pi_0 + \Sigma_{k=1}^{\infty} (\Pi_k \cos(N_s \theta_k - \omega_{sk} t)) \quad (6)$$

By superposition, the flux density in the air gaps 146 may be calculated using $$B = M_H \Pi + M_L \Pi \quad (7)$$

Coupling between two magnetic fields occurs if they have the same space and time harmonics. In this condition:

$$N_s = |p_L + p_H| \quad (8)$$

$$\omega_H = \frac{\omega_s N_s - p_L \omega_L}{N_s - p_L} \quad (9)$$

Under these conditions (4) (5) (6) are substituted into (7) and the resulting series used to calculate the stored energy in each airgap 146, given by (10).

$$W = \frac{rlg}{2\mu_o} \int_0^{2\pi} B^2 d\theta \quad (10)$$

Assuming that the components are rotating synchronously, and defining α to be the relative position of one of the rotors to a synchronously rotating reference frame, the torque harmonics may be found using (11).

$$\tau = \frac{rlg}{2\mu_o} \frac{d}{d\alpha} \left( \int_0^{2\pi} B^2 d\theta \right) \quad (11)$$

In order to investigate pole combinations that minimize unwanted torque components, the field components which contribute to torque production are identified and harmonics up to the 11th harmonic in (4), (5), and (6) are taken into consideration (the summation indices in equations (4), (5) and (6) relate to the harmonics). The analysis identifies components producing steady torque while limiting unwanted torque ripple. The resulting low-speed torque may be written as $$\tau = \frac{p_L \pi rlg M_H \prod_o M_L \prod_1}{4\mu_o} \sin p_L \alpha. \quad (12)$$

where r is the machine radius, l is the core length, g is the air gap 146 length, and $\mu_0$ is the permeability of vacuum, which has a value of $4\pi \times 10^{-7}$ N A$^{-2}$.

This equation is used to design a magnetic gear and determine the number of poles in each rotor and the machine dimensions. Due to limitations of the potential application, the design may have an outer stator and inner high torque rotor. For this reason, a further aspect of the design includes a concentric radial flux gear with a stationary modulating ring 150.

Design of Exemplified Integrated Induction Machines with Magnetic Gears

Figure 4:
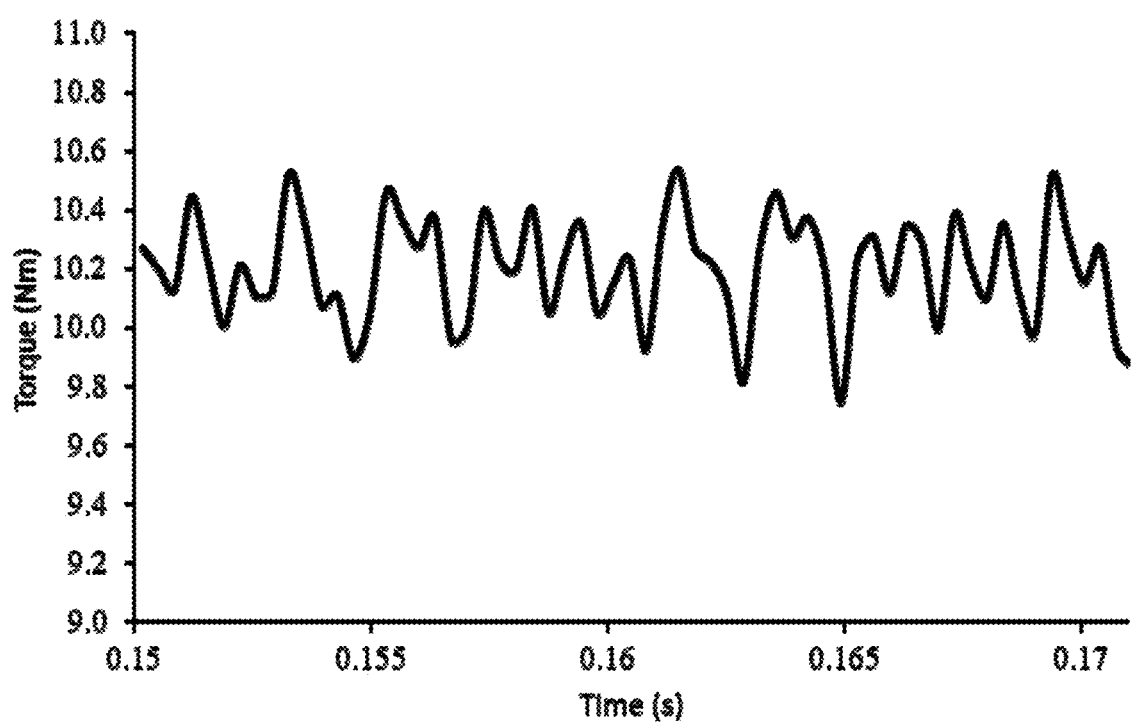
FIG. 4 is a graph of the outer rotor torque ripple for the 21-4 magnetic gear of FIG. 1.

In an illustrative aspect of the system, the target machine speed may be 220 rpm, and the gear ratio should result in a high-side speed below the synchronous speed of an induction machine. Assuming a design frequency of 60 Hz, the potential gear ratios may be limited to those that result in speeds lower than 900 rpm, 1200 rpm or 1800 rpm. Analysis of the potential speeds, gear ratios and torque harmonics results in the selection of a gear ratio of 5.25, corresponding to a high-side speed of 1155 rpm. Initial analysis of the suitable pole combinations indicates that this gear ration may be obtained using either:

(a) 21 pole pairs of north and south inner pole magnet pieces 152 and 154 on the low speed rotor and 4 pole pairs of north and south outer pole magnet pieces 140 and 142 on the high speed rotor or (b) with reference to FIG. 4, 42 pole pairs of north and south inner pole magnet pieces 552 and 554 on the low speed side and 8 pole pairs of north and south outer pole magnet pieces 540 and 542 on the high speed side.

Although not demonstrated by the magnetic gear analysis, a constraint is also imposed that the high speed rotor pole number should not equal the number of poles of the induction machine. Therefore, any 6-pole pair combinations capable of producing a gear ration close to the 5.25 are discounted. The first option of only 42 magnetic poles, vs the second with 42 pole-pairs is preferable for assembly. However, (12) indicates that torque is proportional to pole number; therefore the second option is expected to provide higher torque. It is important to note that the analysis in the above section is simplified and neglects tangential flux components; however for the purposes of an initial screen it is thought to be sufficient. A substantially more detailed analytical evaluation, including tangential flux components, may be found in [7].

21-4 Gear

In the discussion above, a gear ratio of 5.25, corresponding to 21 inner pole pairs and 4 outer pole pairs is found to be a suitable fit for the desired speed ratio. Through an iterative process with the induction machine design (described below), a set of constraints on the outer dimensions of the magnetic gear is obtained. Significant dimensions and parameters are given in Table I and a schematic of the proposed magnetic gear 100 is shown in FIG. 1.

TABLE 1

Magnetic Gear Parameters

| | |
|---|---|
| Inner rotor pole pairs, $p_i$ | 21 |
| Outer rotor pole pairs, $p_o$ | 4 |
| Modulating ring pieces, $n_{mod}$ | 25 |
| Gear ratio, G | 5.25 |
| Air gap (inner and outer rotor sides) | 0.5 mm |
| Magnet thickness | 2.5 mm |
| Modulating ring piece thickness | 2.5 mm |
| Outer airgap radius | 59 mm |
| Inner airgap radius | 47.5 mm |
| Shaft radius | 40 mm |
| Stack length | 54 mm |

Figure 2:
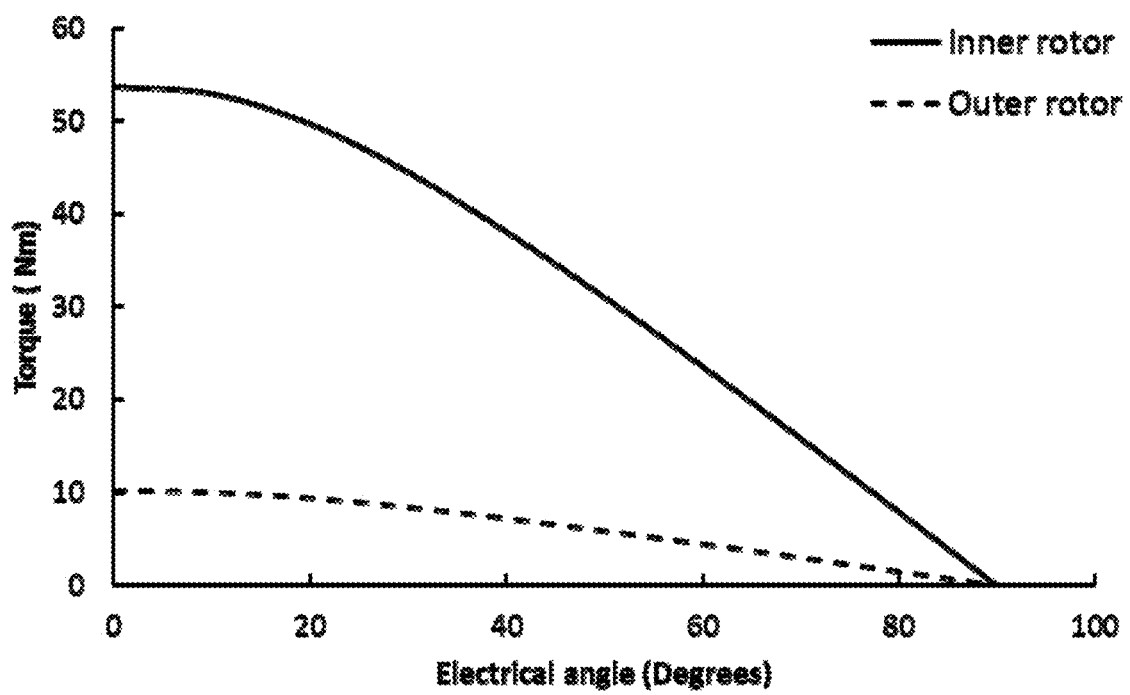
FIG. 2 is a graph of the torque-load angle plot for the 21-4 magnetic gear of FIG. 1.

The magnetic gear 100 is modeled in time-stepped FEA using commercial software (JMAG Designer). Analysis is carried out at a number of discrete load angles, enabling the torque-angle characteristic of the gear to be obtained. This characteristic is plotted in FIG. 2.

It can be seen that the peak torque is 53.5 Nm in steady state on the low speed rotor, with 10 Nm on the high speed rotor. The required torque for a 1.5 kW at 220 rpm is 65.1 Nm. Clearly the 21-4 magnetic gear 100 is not capable of providing the required torque.

Figure 3:
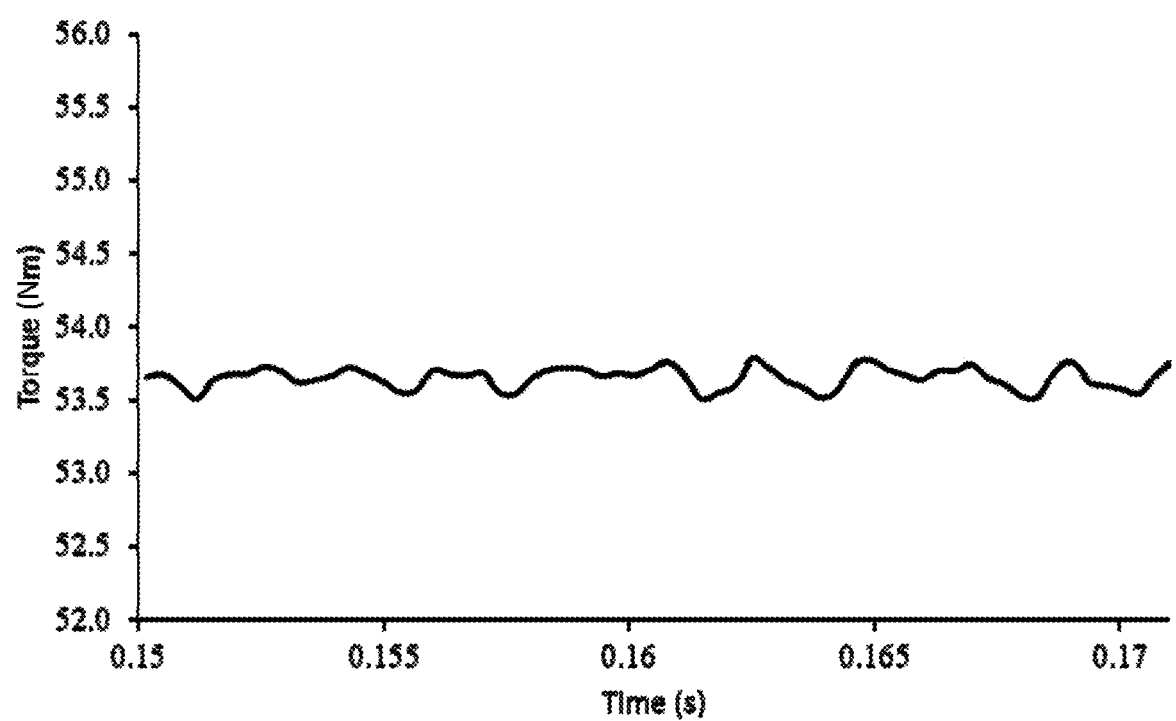
FIG. 3 is a graph of the inner rotor torque ripple for the 21-4 magnetic gear of FIG. 1.

Despite the failure of this first design to meet the required torque, the analysis is useful in determining the ability of the simplified analysis to identify pole combinations that result in low torque ripple. Steady state analysis of the maximum torque condition, with the rotors counter-rotating is conducted and the resulting torque-time plots are shown in FIG. 3 and FIG. 4. The plots in FIGS. 3 and 5 demonstrate that the torque ripple is not significant.

42-8 Gear

Figure 5:
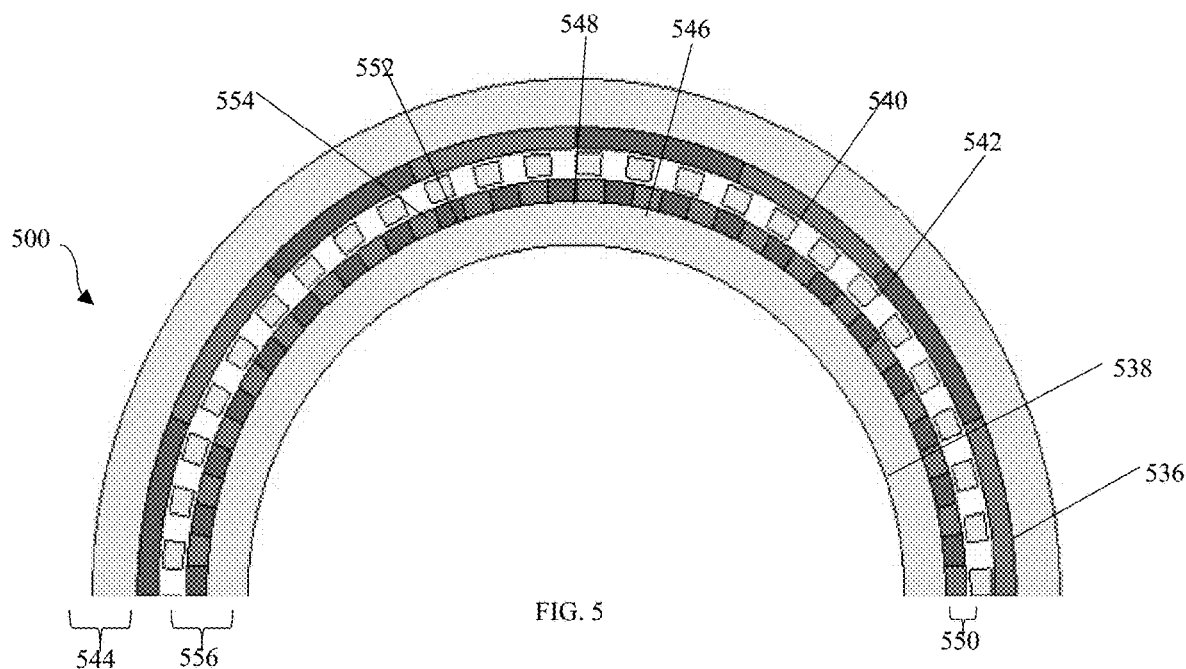
FIG. 5 is a schematic of an example of a section of a 42-8 magnetic gear where only a top half is shown.

As the 21-4 magnetic gear 100 can't fulfill the torque requirement, the 42-8 magnetic gear 500 design shown at FIG. 5 is investigated. The outer dimensions of the gear remain constant, requiring physically smaller magnet poles. Other than the pole and modulating piece numbers, the dimensions in Table I are maintained for the 42-8 magnetic gear 500 design.

The design process to develop an integrated induction machine began with an analysis of a synchronous system, the magnetic gear, and an asynchronous machine. While the final system may result in linked magnetic fields from the two sub-systems, the design process initially addresses each of the sub-systems individually.

The first step is to develop a suitable magnetic gear design; the second is to design an induction machine that uses the magnetic gear size to define its interior parameters. The final stage of the design process is to address any unwanted cross-coupling effects and modify the design accordingly. This process has been used to ensure that the magnetic gear components may be physically realized.

Magnetic Gear Design

A magnetic gear uses permanent magnets to transmit torque between an input and output shaft without mechanical contact. Torque densities, typically in the range 40-80 kNm/m, can be achieved with higher efficiency at full load and part load than a mechanical gear. For higher power ratings, a magnetic gear may be smaller, lighter and lower cost than a mechanical gear. Since there is no mechanical contact between the moving parts there is no wear and lubrication is not required. Magnetic gears inherently protect against overloads by harmlessly slipping if an overload torque is applied, and automatically and safely re-engaging when the fault torque is removed. Furthermore, magnetic gears significantly reduce harmful drivetrain pulsations, allow for misalignment/vibration of shafts, have very low acoustic noise and vibrations and have improved reliability [1-9].

In the illustrative example of FIG. 5, the inner 556 and outer 544 rotors are counter-rotating. A gear ratio of 5.25, corresponding to 42 inner pole pairs (inner north and south pole magnet pieces 540 and 542) and 8 outer pole pairs (outer north and south pole magnet pieces 552 and 554) is found to be a suitable fit. At this gear ratio, the outer gear rotor 544 speed is 1155 rpm at the desired inner rotor 556 speed of 220 rpm, corresponding to a slip of 0.0375 for a 6 pole 60 Hz induction machine. The choice of gear ratio and pole numbers is constrained by minimum magnet dimensions, chosen to be 2.5 mm and the need for the high speed to correspond to a low slip for a conventional low pole number induction machine. In a larger machine, wider ranges of pole numbers and gear ratios are permissible.

Significant dimensions and parameters are given in Table II and a schematic of the proposed magnetic gear is shown in FIG. 5.

TABLE II

Magnetic Gear Parameters

| | |
|---|---|
| Inner rotor pole pairs, $p_i$ | 42 |
| Outer rotor pole pairs, $p_o$ | 8 |
| Modulating ring pieces, $n_{mod}$ | 50 |
| Gear ratio, G | 5.25 |
| Air gap (inner and outer rotor sides) | 0.5 mm |
| Magnet thickness | 2.5 mm |
| Modulating ring piece thickness | 2.5 mm |
| Outer airgap radius | 59 mm |
| Inner airgap radius | 47.5 mm |
| Shaft radius | 40 mm |
| Stack length | 50 mm |

Figure 6:
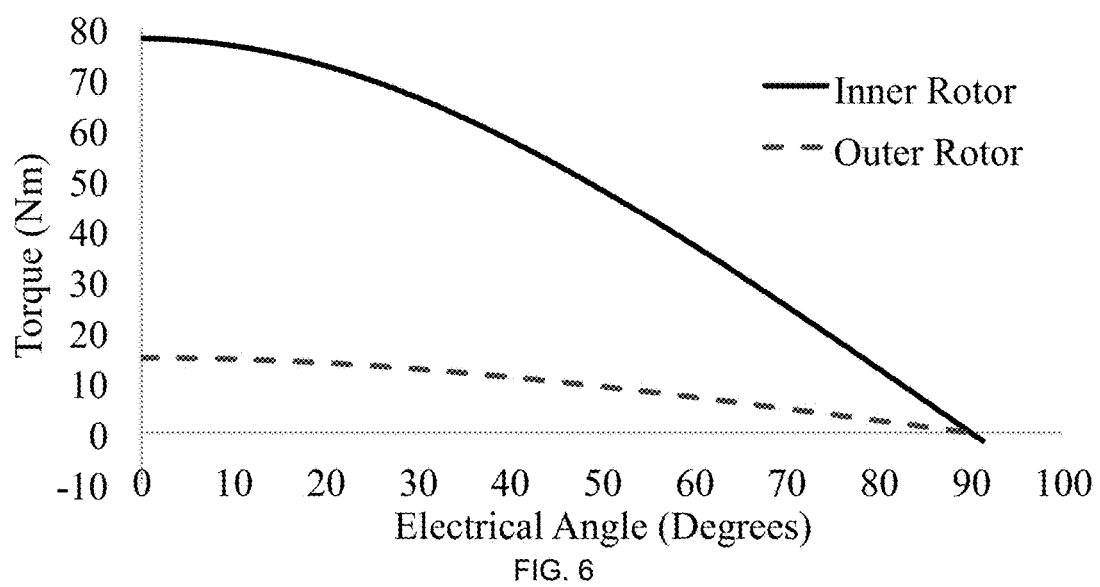
FIG. 6 is a graph of the torque-load angle plot for the 42-8 magnetic gear of FIG. 5.

For a desired rating of 1.5 kW 220 rpm, exemplary settings may include the high torque side requirement being equal 65.1 Nm, corresponding to 12.4 Nm at the low torque side. An investigation of the torque-angle properties is carried out using 2-D FEA. With one of the rotors stationary, the other rotor is rotated through 90 electrical degrees. The resulting data is plotted in FIG. 6. It can be seen that the peak torque exceeds the required maximum value, with rated torque occurring when the angle between the rotors is approximately 30 electrical degrees from the position corresponding to maximum torque.

Figure 7:
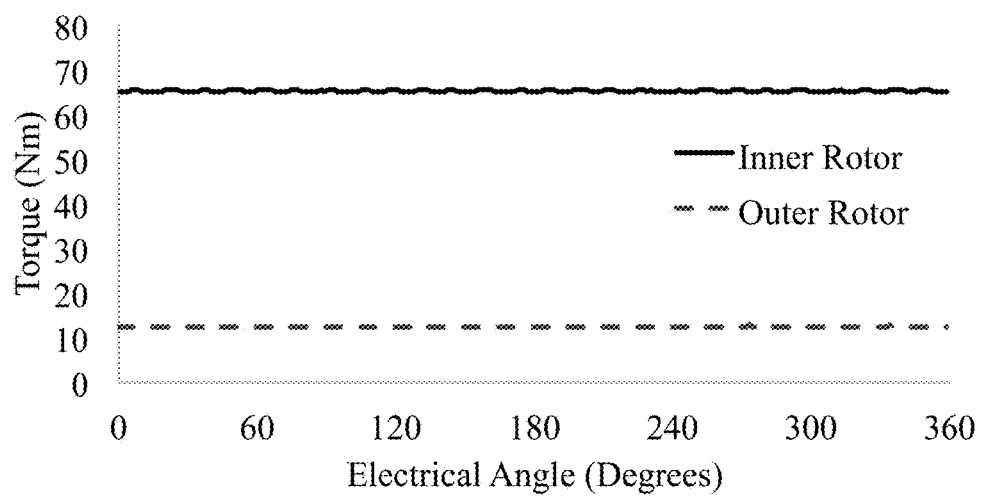
FIG. 7 is a graph of the gear torques at constant speed gear.

The predicted torque for constant speed operation at an angle of 31.2 electrical degrees is plotted in FIG. 7, demonstrating low torque ripple on the high torque output rotor. As expected, the electromagnetic torques are in the same direction, supporting motion for one rotor and opposing rotation for the other rotor.

Induction Machine Design

It can be seen from Table II that the magnetic gear design that meets the torque and speed requirements for this example has an aspect ratio with a relatively short shaft and large diameter. To enable an integrated magnetic gear, the induction machine 800 may require a stack length of 54 mm with an inside diameter of 118 mm. However, during the design process, constraints that may normally be placed on an induction machine design are relaxed as the machine is not intended to be required to operate under direct on-line starting. A conventional induction machine design process is used, together with commercial machine design software (e.g., JMAG Express). Parameters for a candidate 6-pole design that meets the requirements are shown in Table III with a schematic cross-section in FIG. 8.

TABLE III

| Induction machine parameters | |
|---|---|
| Rated voltage | 120 V |
| Rated frequency | 60 Hz |
| Number of stator poles | 6 poles |
| Number of turns | 17 turns |
| Number of stator slots | 36 slot |
| Tooth width | 8 mm |
| Core back width | 14 mm |
| Stator outer radius | 115 mm |
| Stator inner radius | 80.6 |
| Air gap | 0.6 mm |
| Length | 54 mm |
| Number of rotor bars | 40 bars |
| Distance between bar edge centers | 6 mm |
| Bar outer radius | 3 mm |
| Bar inner radius | 3 mm |

Figure 8:
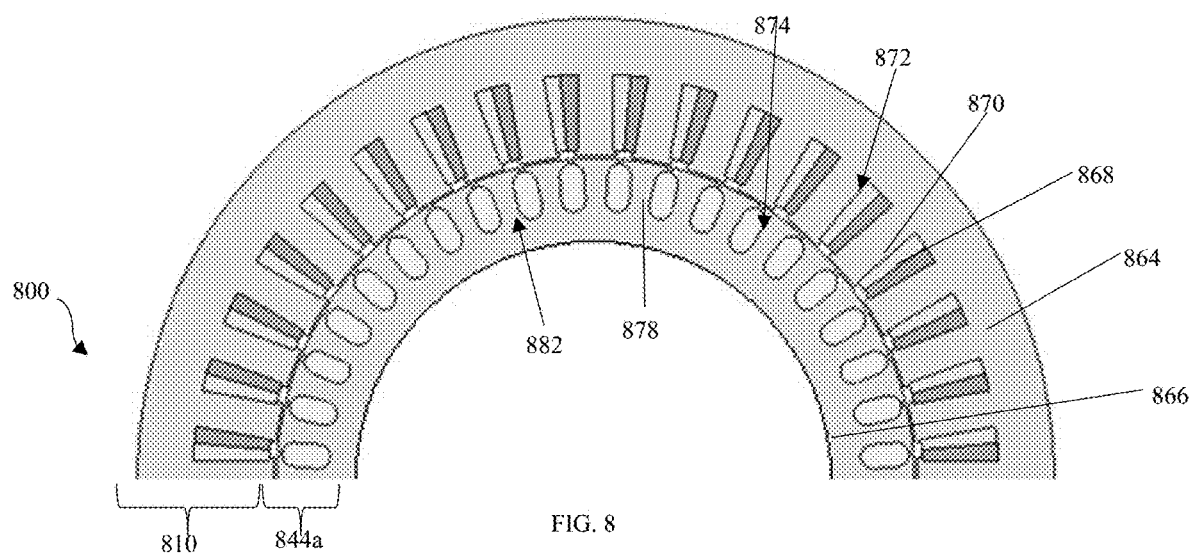
FIG. 8 is a schematic of an embodiment of an induction machine where only a top half cross section is shown.
Figure 9:
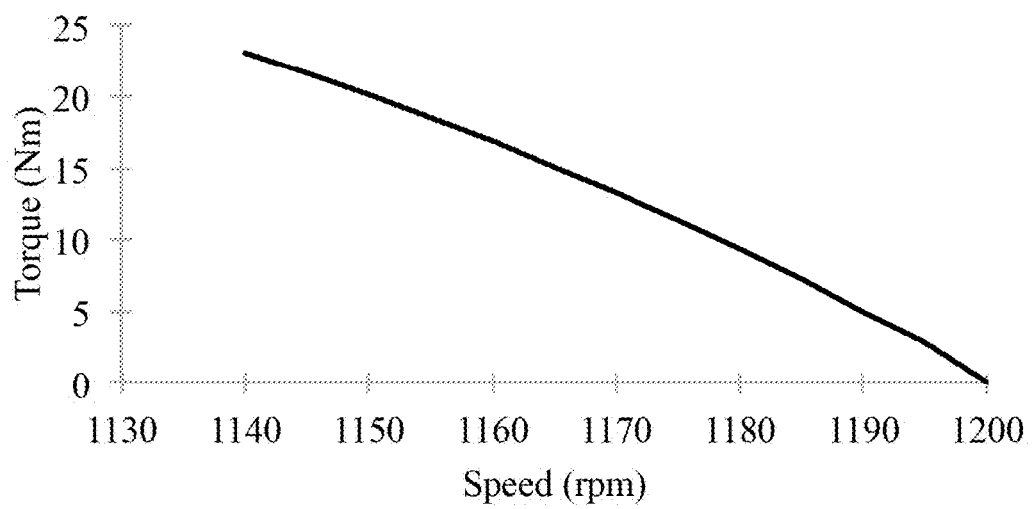
FIG. 9 is a graph of the torque-speed curve for the induction machine of FIG. 8.
Figure 10:
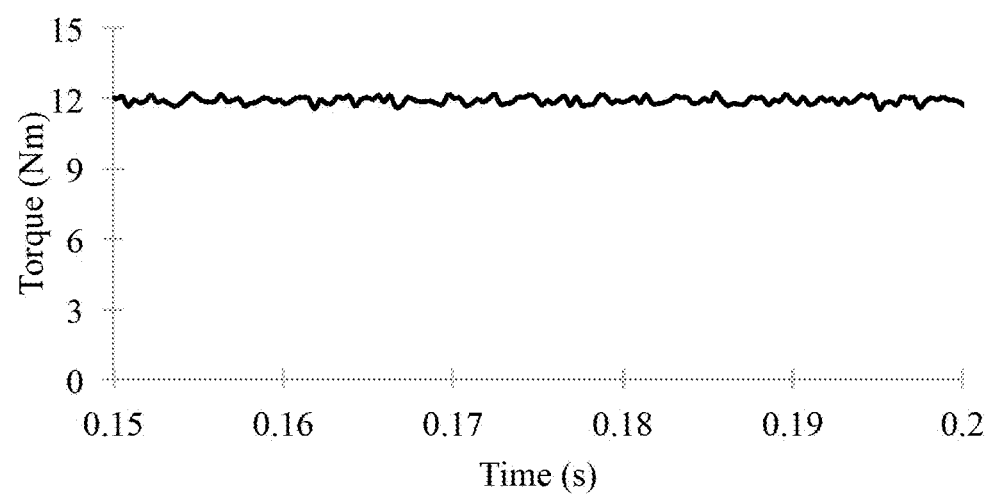
FIG. 10 is a graph of the induction machine torque as a function of time for the induction machine of FIG. 8.

Simulations of induction machine 800 shown at FIG. 8, operating under constant speed operation are carried out a number of slips, and the resulting torque-speed curve for low slips is plotted as shown in FIG. 9. The illustrative embodiment of FIG. 8 includes an outer stator 810 comprising AC windings 868 and 870 placed in stator slots 872; and further illustrates a portion 844a of a high speed rotor rotor including rotor bars 878. When simulating a steady state speed of 1172 rpm, the induction machine predicted torque is 12 Nm, as shown in FIG. 10. The plot of the variation of slip with time indicates that although the rotor is not skewed, the torque ripple is not significant. When close to 1172 rpm, if the induction machine is integrated with the magnetic gear, the induction torque on the rotor can be approximately equal and opposite to the torque from the magnetic gear.

Induction Machine Integrated with Magnetic Gear

Figure 11:
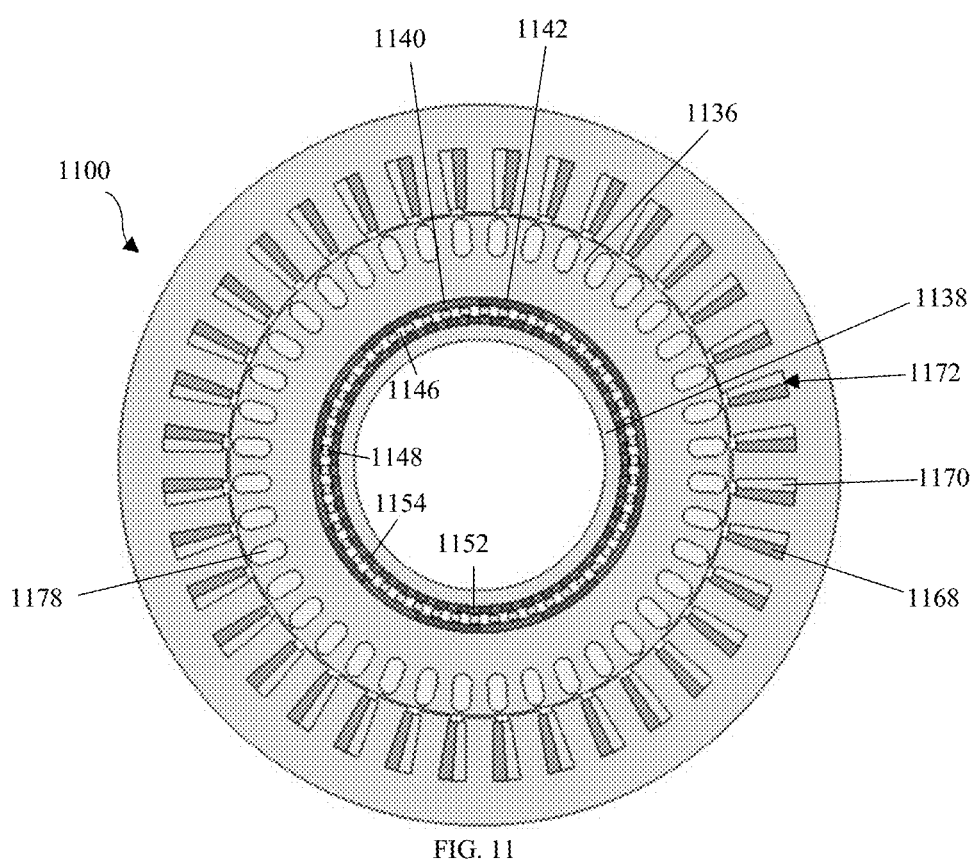
FIG. 11 is a schematic of a cross section of one example of the induction machine with integrated magnetic gear having the 42-8 magnetic gear of FIG. 8.

The design process to develop an integrated machine 1100 as shown in the embodiment of FIG. 11, includes an analysis of an asynchronous machine coupled with a synchronous gear, with two rotors interacting to produce torque across 3 air gaps. In order to simulate this set of conditions in a reasonable time but with accuracy to understand harmonic torques, time stepped FEA simulations are carried out under constant speed conditions.

The final stage of the design process is to integrate the machine and gear. Since the induction machine action and outer magnetic gear share back-iron, it is expected that the fields from these components will cross-saturate and may interact. The net effect of this interaction is minimized by the pole combinations chosen earlier. The induction machine may be a 6-pole system, while the outer rotor may include 16 poles. The reluctance of the magnetic gear is similar to a large airgap, as seen from the stator, while the high outer gear pole number will limit the penetration of the gear flux through the outer rotor. A negative impact of this, from the investigation and simulation perspective, is that there is no magnetic symmetry in the system and a full machine model is required. A schematic showing the assembly is shown in FIG. 11 and a flux line plot illustrating the interaction between induction and gear magnetic fields is presented in FIG. 12.

The interaction of the magnetic fields in the outer rotor preferably includes either a full mechanical dynamic simulation to balance torques, or an iterative set of constant speed, constant load angle simulations. The latter option was used herein. The torque is calculated as the total torque exerted on a component. In steady state for the magnetic gear system, the net torque on the outer rotor should be zero. The torque transmitted from the stator to the outer rotor may be evaluated by calculating the reaction torque exerted on the stator.

The challenge was how to operate the synchronous device which is the magnetic gear with the asynchronous device which is the induction machine. To operate the integrated machine at a certain torque, we checked the appropriate induction machine speed to give this torque and load angle of the magnetic gear to give the same outer rotor torque.

Figure 12:
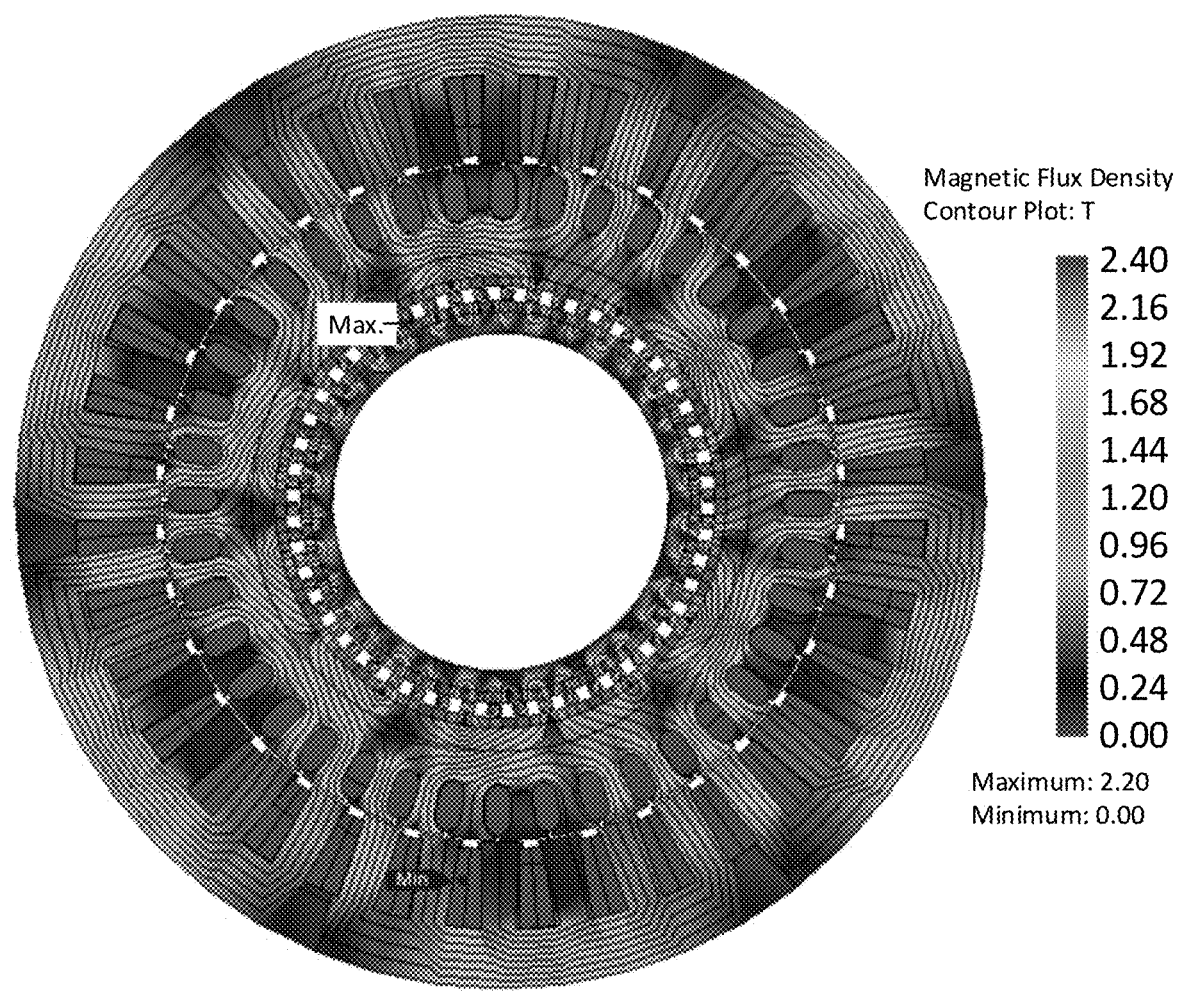
FIG. 12 is a schematic of a cross section of induction machine of FIG. 11, showing flux density pattern.
Figure 13:
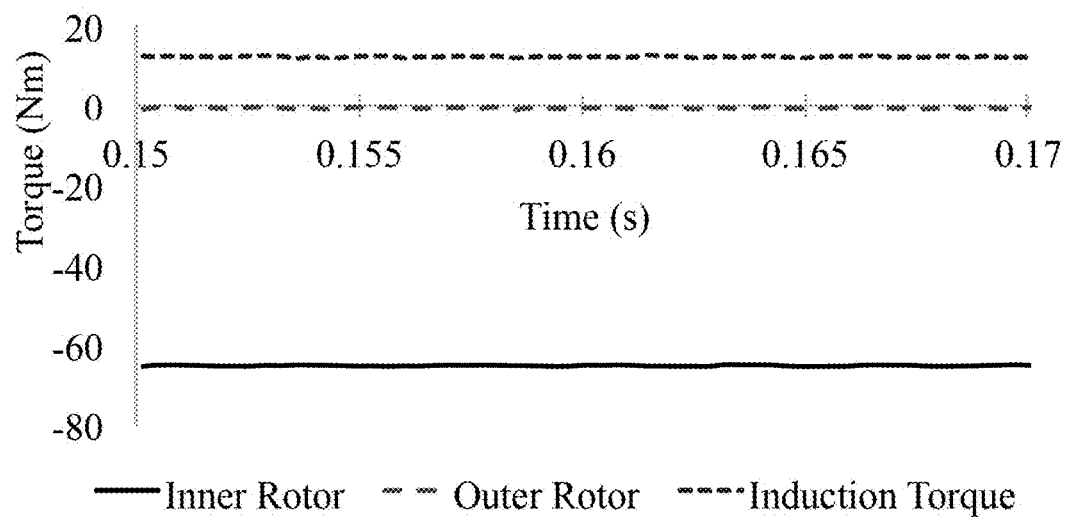
FIG. 13 is a graph of the torque of the induction machine of FIG. 11.

In an illustrative simulation, operation at 1172 rpm for the outer rotor, 223.2 rpm for the inner rotor and initial electrical angle of 31.2 degrees gave the torque data plotted in FIG. 12. In this diagram, induction torque is shown as positive, supporting the counter-clockwise rotation of the outer rotor. The inner rotor torque is calculated as having a negative value, supporting clockwise rotation of the inner rotor. For the period shown in FIG. 13, the mean induction torque is calculated to be 12.2 Nm, the mean torque transmitted to the inner rotor is 65.3 Nm, corresponding to an output power of 1.52 kW. The calculation also indicates that the net outer rotor torque is −0.5 Nm. This illustrates the impact of the interaction of the magnetic fields of the two subsystem components; the ideal linear sum of components at this condition should give zero net torque to the outer rotor. However, the result is considered acceptable to begin design considerations.

The torque density of the design example may be calculated in terms of total volume and active volume, neglecting end winding overhang. Applications for this type of machine may exceed power levels higher than the 1.5 kW target herein. At low power, the stack length is relatively short due to the limits on magnet size that have been imposed to facilitate assembly, (i.e., the induction machine is short with a large diameter when compared to a commercial 1.5 kW 6-pole motor). The end winding overhang may exceed the stack length in the design example. The total net torque density for the system including allowance for end windings is expected to be 15.6 kNm/m$^3$ rated, 19.1 kNm/m$^3$ peak. Using active volume as a guide for scaling to larger machines, the torque density values are 33 kNm/m$^3$ rated, 40.5 kNm/m$^3$ peak.

Loading

Figure 14:
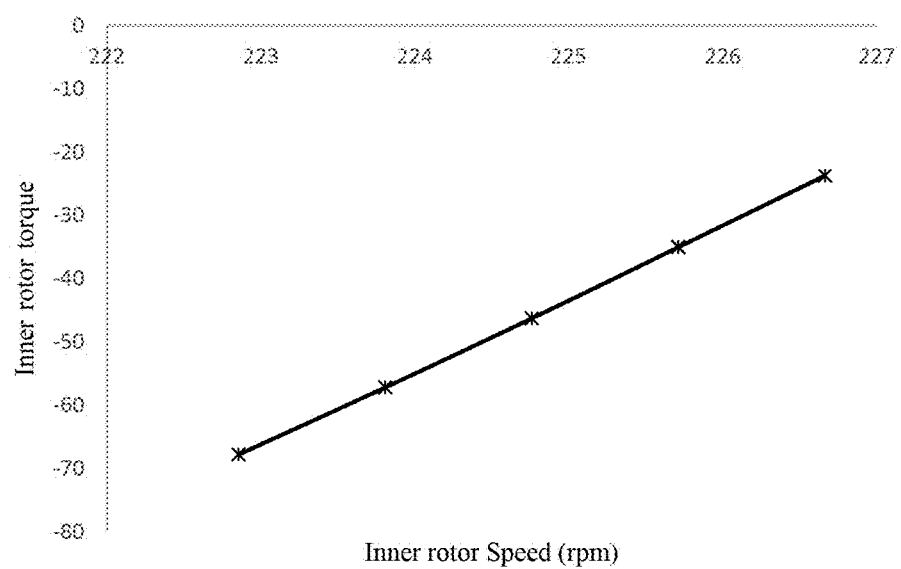
FIG. 14 is a graph of the torque-speed for the induction machine of FIG. 11.
Figure 15:
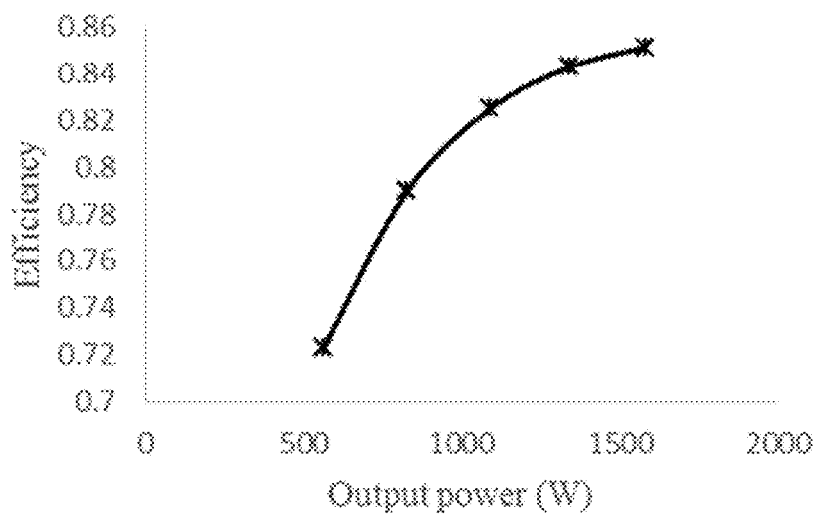
FIG. 15 is a graph of the efficiency-output power for the induction machine of FIG. 11.

The proposed machine was simulated at different loads. FIG. 14 plots the torque speed characteristics of the machine in this example. The predicted efficiency curve is shown in FIG. 15. The simulated efficiency of the design example machine has good values compared to a commercial 1.5 kW 6-pole motor. The design example also has the ability to run at low speed and has high torque due to the presence of the magnetic gear.

Analysis of the torque—speed characteristic and efficiency calculations highlight one of the difficulties of analysis of a system that combines asynchronous and synchronous torque mechanisms. An iterative process is required at each load condition, in order to identify the exact speed and load angle combination such that the net torque on the outer rotor is zero. If this torque is non-zero, the outer rotor is effectively a second mechanical output port, complicating efficiency calculations from input power and inner rotor output power. To enable rapid calculations of the potential performance in the initial design stage this reason, the efficiency is calculated by subtracting calculated losses from the simulation input power.

Loss Analysis

With reference to FIG. 11, torque transmission of the magnetic gear is based on the modulation of magnetic field using ferromagnetic pole pieces 1148 between the outer rotor and the inner rotor. However, because of the modulation effect, the magnetic fields produced by either the outer 1140, 1442 or the inner permanent magnets 1152, 1554 have many sub-harmonics. These unwanted harmonics lead to undesirable effects, such as high permanent magnet eddy current loss and iron core loss, low efficiency, noise and vibration. Due to significant amount of heat caused by the losses, partial irreversible demagnetization of the magnets may occur [12], [13].

Joule Loss

These losses occur due to current flowing in stator and rotor windings. As the load changes, the current flowing in rotor and stator winding also changes and hence these losses also change.

Figure 16:
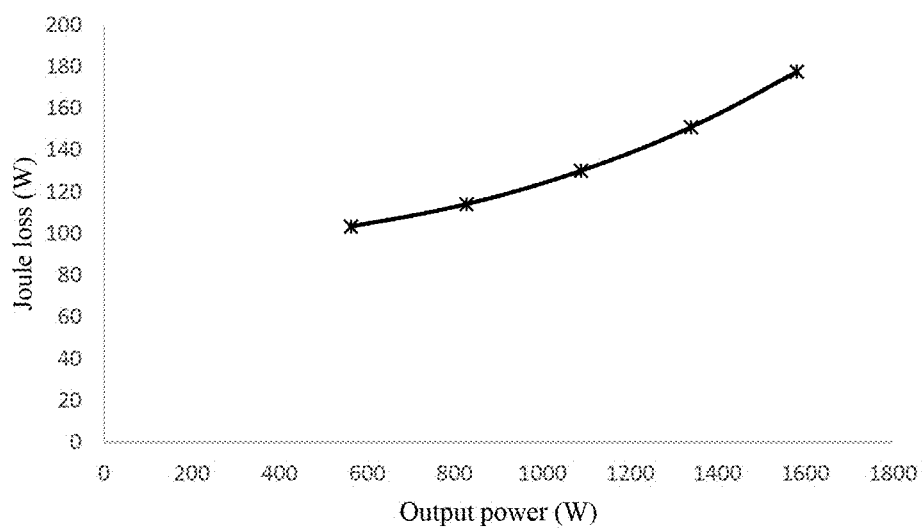
FIG. 16 is a graph of the variation of conductor Joule losses with output power for the induction machine of FIG. 11.

FIG. 16 shows the variation in the Joule loss at different load output power.

Iron Loss

Iron loss is calculated in two components: eddy current loss and hysteresis. The eddy current losses are assumed to be proportional to the square of frequency and the hysteresis losses proportional to frequency. The frequency of the field in the stator is always the supply frequency, f and the fundamental frequency in the rotor is slip times the supply frequency, (sf) which is always less than the stator frequency. Hence the rotor core loss is very small as compared to stator core loss.

The harmonic orders of eddy current loss can be expected from the interaction between magnetomotive force M and permeance P as follows:

$$M = M \cos(p\theta - \omega_1 t) \quad (13)$$

$$P = P_o + P_{ss} \cos(N_s \theta) \quad (14)$$

Slotting frequency seen by the rotor is given by:

$$1 - \frac{p \pm N_s}{p}(1-s) \times f \quad (15)$$

For 6 pole, and a 36 slot stator 1172, the expected harmonic orders in the rotor are s±12 n(1−s) where n is an integer. When the machine is running at 1170 rpm, the slip s=0.025 so the expected harmonic orders in the rotor are |0.025±11.7 n| which can be seen in FIG. 17.

Figure 17:
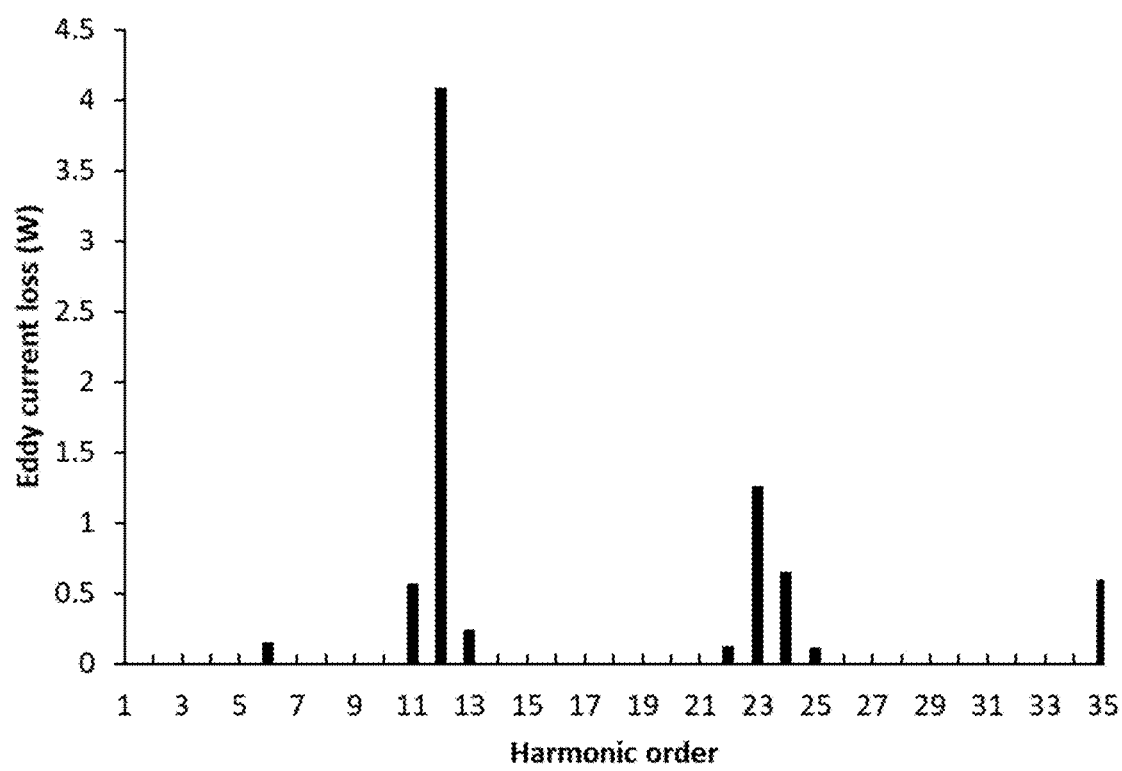
FIG. 17 is a graph of the spectrum of eddy current loss components in the outer rotor for the induction machine of FIG. 11.
Figure 18:
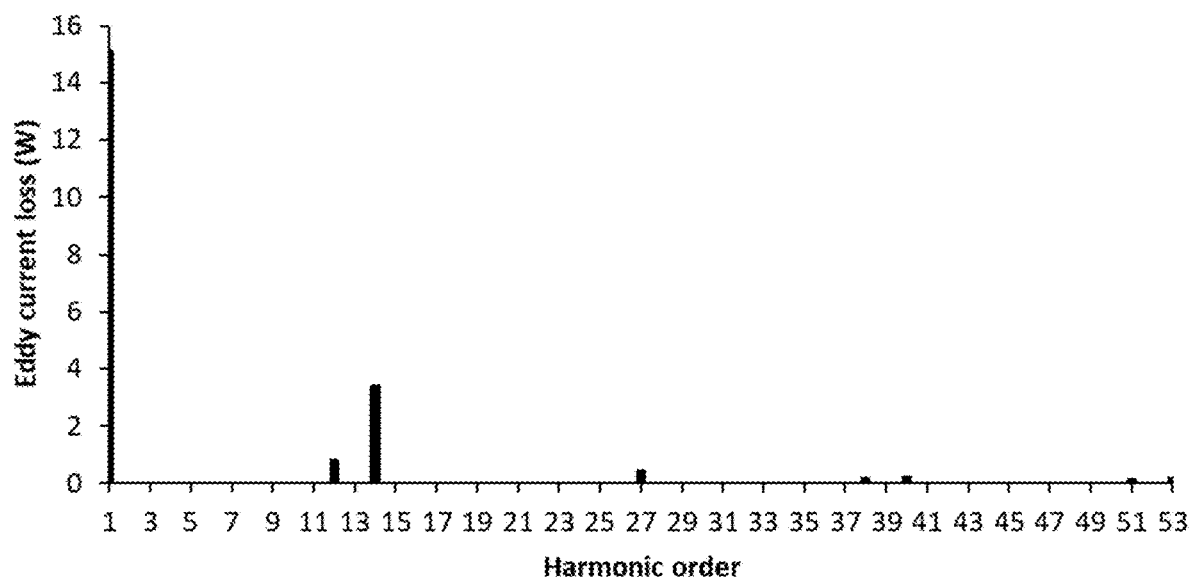
FIG. 18 is a graph of the spectrum of eddy current loss components in the stator for the induction machine of FIG. 11.
Figure 19:
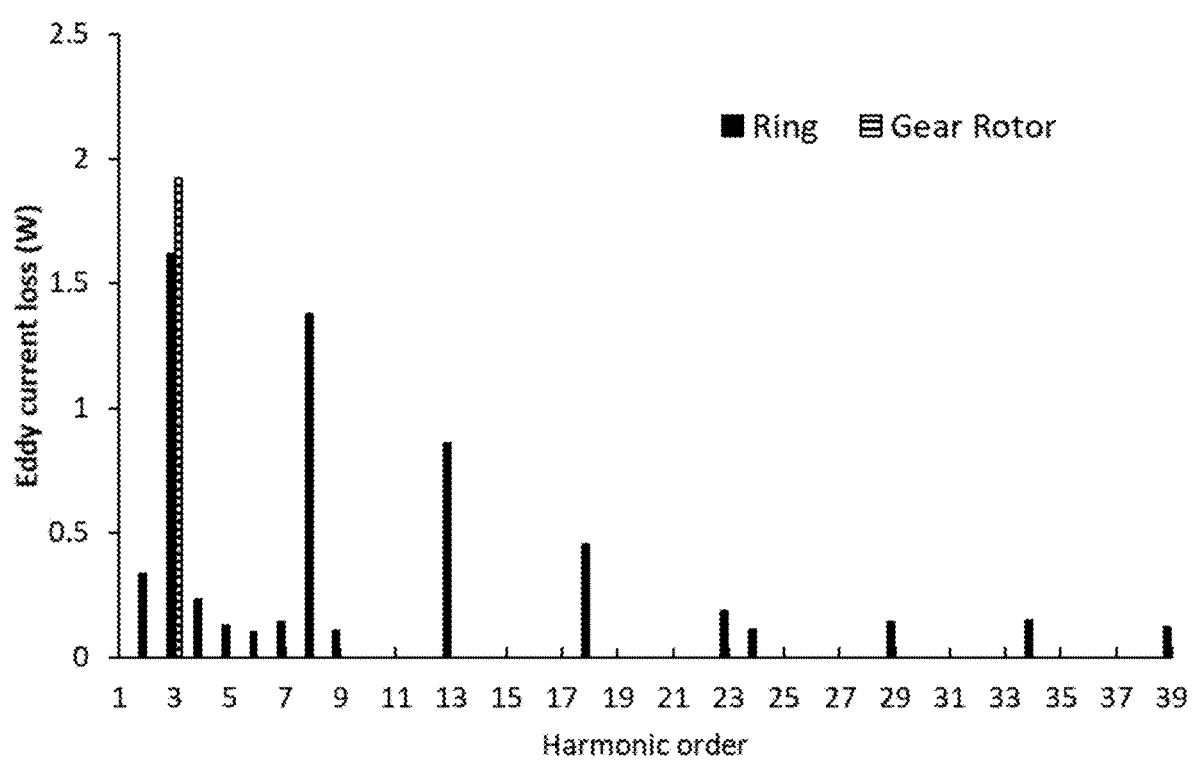
FIG. 19 is a graph of the spectrum of eddy current loss components in the ring and gear rotor for the induction machine of FIG. 11.
Figure 20:
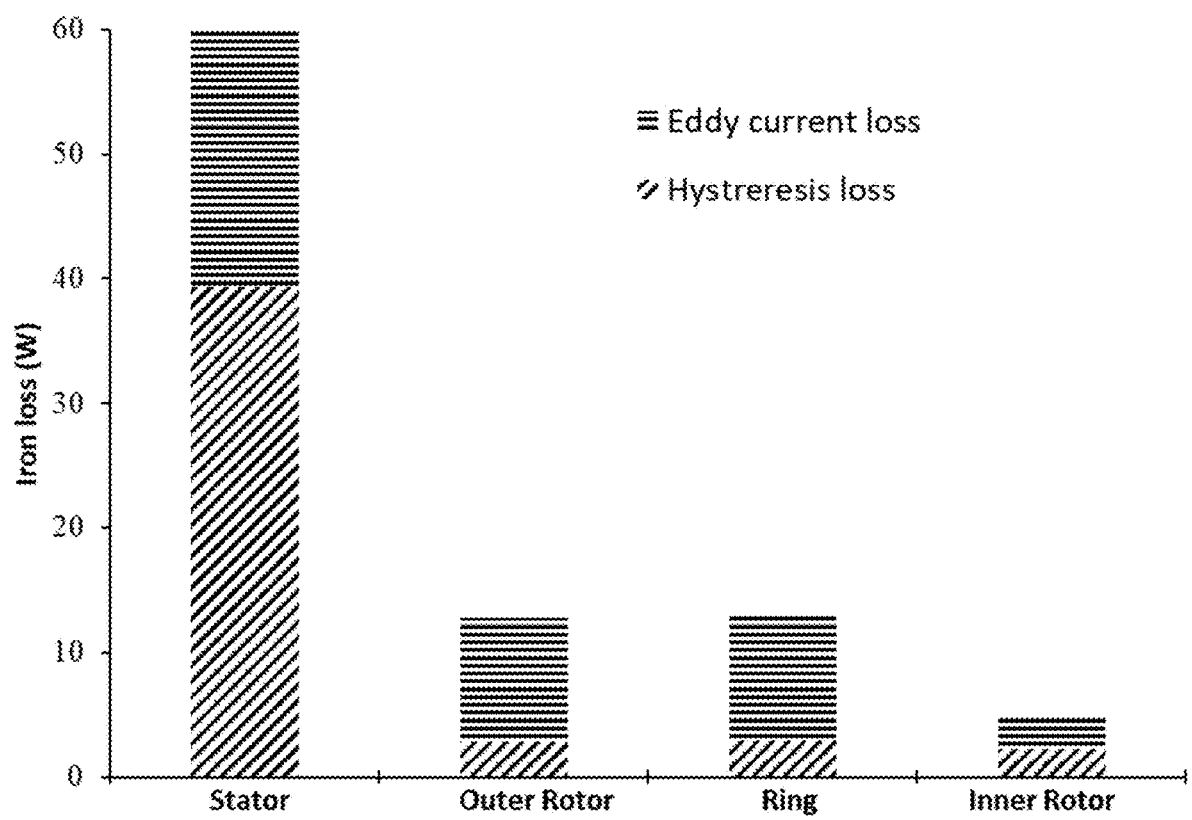
FIG. 20 is a graph of the iron loss distribution in the different machine parts for the induction machine of FIG. 11.

The harmonic components of the eddy current losses in the different machine parts are shown in FIGS. 17, 18, and 19. Induction rotor losses are at the frequencies given by (6), stator loss occurs primarily at fundamental supply frequency, plus 11th and 13th harmonics. Losses in the ring and gear rotor are substantially lower than in the other parts of the machine Total iron losses in each part of the machine are shown in FIG. 20. In this plot it can be seen that the iron loss of the stator is the highest as expected and as discussed earlier, losses in the outer rotor and modulating ring are similar with the iron loss in the inner gear rotor being the lowest. As shown in FIG. 20, most of the core loss in the stator is hysteresis and can be reduced by using high quality iron which has low hysteresis coefficient and high permeability. In the other parts of the machine, the significant part of the core losses is the eddy current which can be reduced by using thinner laminations.

The present disclosure shows the integration of a magnetic gear 500 into an induction machine 800 system. The resulting machine 1100 offers high torque low speed output at high torque density, and may enable simple sensorless operation. This may result from grid connection or open loop control. The torque density excluding end-windings is 33 kN/m, for a 1.5 kW induction machine drive. Given that this design example is a small machine with disproportionally large end-winding overhang, this figure illustrates the overall potential when the design is scaled up to a larger size.

The combination of high torque density and low-to-no control complexity is attractive for a number of applications. Machine design, simulation of its performance and efficiency and losses analysis for operation across a range of operating points have all been discussed. The results have demonstrated the implementation of this machine which may provide high-torque low-speed easy-control direct drive which may be a good fit for many systems.

In the preceding description, for purposes of explanation, numerous details are set forth in order to provide a thorough understanding of the embodiments. However, it will be apparent to one skilled in the art that these specific details are not required. The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

REFERENCES

[1] A. Penzkofer, K. Atallah, "Magnetic Gears for High Torque Applications", in Magnetics, IEEE Transactions on, vol. 50, no. 11, pp. 1-4, November 2014.

[2] K. K. Uppalapati, W. Bomela, J. Z. Bird, M. Calvin, J. Wright, "Construction of a low speed flux focusing magnetic gear", in Energy Conversion Congress and Exposition (ECCE), 2013 IEEE, vol., no., pp. 2178-2184, 15-19 Sep. 2013.

[3] K. Atallah, S. Calverley, R. Clark, J. Rens, D. Howe, "A new PM machine topology for low-speed, high-torque drives", in Electrical Machines, 2008, ICEM 2008, 18th International Conference on, vol., no., pp. 1-4, 6-9 Sep. 2008.

[4] M. Bouheraoua, J. Wang, K. Atallah, "Influence of Control Structures and Load Parameters on Performance of a Pseudo Direct Drive", Machines 2, no. 3: 158-175, 2014.

[5] K. Atallah, J. Rens, S. Mezani, D. Howe. "A novel "Pseudo" direct-drive brushless permanent magnet machine", Magnetics, IEEE Transactions on 44, no. 11 (2008): 4349-4352.
[6] L. Mathe, N. I. Berg, R. K. Holm, T. N. Matzen, P. O. Rasmussen, K. K. Jensen, "Motor Integrated Permanent Magnet Gear in a Battery Electrical Vehicle", IEEE Trans Industry Applications Vol 51, No 2, 2015, pp 1516-1525.
[7] K. Atallah, S. D. Calverley, D. Howe, "Design, analysis and realisation of a high-performance magnetic gear," IEE Proc. Elec. Power Appl. Vol 151, no 2, 2004, pp 135-153.
[8] K. T. Chau, D. Zhang, J. Z. Jiang, C. Liu, and Y. Zhang, "Design of a magnetic-geared outer-rotor permanent-magnet brushless motor for electric vehicles," IEEE Trans. Magn., vol. 43, no. 6, pp. 2504-2506, 2007.
[9] P. O. Rasmussen, T. O. Andersen, F. T. Joergensen, O. Nielsen., "Development of a High-Performance Magnetic Gear", IEEE Transactions on Industry Applications, Vol. 41, Issue. 3, 764-770, May-June 2005.
[10] F. Spinato, P. J. Tavner, G. J. W. Van Bussel, E. Koutoulakos, "Reliability of wind turbine subassemblies", IET Renewable Power Generation Vol 3, No 4, pp 387-41 December 2009.
[11] A. el-Rafaie, M. Shah, "Comparison of Induction Machine Performance with Distributed and Fractional-Slot Concentrated Windings", Proc IEEE IAS Annual Meeting, October 2008.
[12] Y. Zhang, K. Lu, and Y. Ye, "Permanent magnet eddy current loss analysis of a novel motor integrated permanent magnet gear", IEEE Trans. Magn., vol. 48, no. 11, pp. 3005-3008, 2012.
[13] T. V Frandsen and P. O. Rasmussen, "Loss Investigation of Motor Integrated Permanent Magnet Gear", pp. 2673-2679, 2014.
[14] K. Atallah and D. Howe, "A novel high-performance magnetic gear," Magnetics, IEEE Transactions on, vol. 37, pp. 2844-2846, July 2001.
[15] C. Lewis, "The Advanced Induction Motor", Power Engineering Society Summer Meeting, 2002 IEEE, Chicago, Ill., USA, 2002, pp. 250-253 vol. 1.
[16] N. Frank and H. Toliyat, "Gearing ratios of a magnetic gear for wind turbines," Electric Machines and Drives Conference, 2009. IEMDC '09, IEEE International, pp. 1224-1230, May 2009.
[17] N. Frank and H. Toliyat, "Analysis of the concentric planetary magnetic gear with strengthened stator and interior permanent magnet inner rotor", Industry Applications, IEEE Transactions, vol. 47, no. 4, pp. 1652-1660, 2011.

What is claimed is:

1. An induction machine with integrated magnetic gears, comprising:
    i) an outer stator comprising ferromagnetic material and ac winding placed in stator slots, for producing a rotating magnetic field with a defined number of pole pairs that is synchronized with a supply frequency;
    ii) a high speed rotor positioned within the outer stator, the high speed rotor comprising ferromagnetic material, rotor bars and permanent magnet pole pieces, wherein a combination of rotor bars, pole pairs and permanent magnet pole pieces is selected so that the permanent magnet pole pieces do not interact with the rotating magnetic field and wherein rotation of the high speed rotor is asynchronously coupled to the rotating magnetic field;
    iii) an inner stator with ferromagnetic steel segments that modulate a high speed rotor magnetic field produced by the permanent magnet pole pieces of the high speed rotor; and
    iv) a low speed inner rotor comprising ferromagnetic material and permanent magnet pole pieces, the low speed inner rotor counter-rotating to the high speed rotor;
    wherein the high speed rotor, low speed inner rotor, outer stator and inner stator are arranged concentrically about a shaft;
    wherein the low speed inner rotor is synchronously coupled to the high speed rotor using modulation harmonics; and
    wherein a combination of modulating segments and number of permanent magnet pole pieces on the high speed rotor and the low speed inner rotor provide the desired magnetic gearing between the high speed rotor and the low speed inner rotor.

2. The induction machine of claim 1 wherein the combination of rotor bar numbers, pole pairs and permanent magnet pole pieces and the combination of modulating segments and number of permanent magnet pole pieces on the high speed rotor and the low speed inner rotor is selected in accordance with an equation comprising:

$$\tau = \frac{p_L \pi r l g M_H \prod_o M_L \prod_1}{4\mu_o} \sin p_L \alpha$$

wherein $\tau$ is torque, r is the induction machine radius, l is the core length, g is the air gap length; $p_L$ is the number of pole pieces of the low speed inner rotor, $\alpha$ is an angle of one of the rotors in a synchronously rotating reference frame, $\Pi_0$ is the zeroth coefficient of a Fourier series defining a permeance of the modulating ring, $\Pi_1$ is the first coefficient of the Fourier series defining the permeance of the modulating ring, $\mu_0$ is the permeability of vacuum, $M_H$ is the magnetomotive force associated to the high speed rotor magnet pieces and $M_L$ is the magnetomotive force associated to the low speed inner rotor magnet pieces.

3. A method of determining the number of ring pieces and machine dimensions for an induction machine integrated with magnetic gear, comprising:
    a. providing operating conditions of the induction machine, wherein the operating conditions are selected from the required speed and torque,
    b. providing the induction machine with internal magnetic gear having two stators and two rotors, wherein the rotors include a high speed rotor and a low speed rotor,
    c. determining a combination of rotor bar numbers, pole pairs and permanent magnet pole pieces and a combination of modulating segments and number of permanent magnet pole pieces on the high speed rotor and the low speed rotor are selected in accordance with an equation comprising:

$$\tau = \frac{p_L \pi r l g M_H \prod_o M_L \prod_1}{4\mu_o} \sin p_L \alpha$$

wherein $\tau$ is the torque, r is the induction machine radius, l is the core length, g is the air gap length; $p_L$ is the number of pole pieces of the low speed inner rotor, $\alpha$ is an angle of one of the rotors in a synchronously rotating reference frame, $\Pi_0$ is the zeroth coefficient of a Fourier series defining a permeance of the modulating ring, $\Pi_1$ is the first coefficient of the Fourier series defining the permeance of the modulating ring, $\mu_0$ is the permeability of vacuum, $M_H$ is the magnetomotive force associated to the high speed rotor magnet pieces and $M_L$ is the magnetomotive force associated to the low speed inner rotor magnet pieces; and d. incorporating the determined combinations into the two stators and two rotors.

4. A method of integrating an induction machine with a magnetic gear, comprising
  a. providing an induction machine with internal magnetic gear having two stators and two rotors, wherein the two rotors comprise a high speed rotor and a low speed rotor,
  b. determining a number of ring pieces and induction machine dimensions comprising steps of:
    i. providing operating conditions of the induction machine, wherein the operating conditions are selected from a required speed and torque,
    ii. determining a combination of rotor bar numbers, pole pairs and permanent magnet pole pieces and a combination of modulating segments and number of permanent magnet pole pieces on the high speed rotor and the low speed rotor are selected in accordance with an equation comprising:

$$\tau = \frac{p_L \pi r l g M_H \prod_o M_L \prod_1}{4\mu_o} \sin p_L \alpha$$

wherein $\tau$ is the torque, r is the induction machine radius, l is the core length, g is the air gap length; $p_L$ is the number of pole pieces of the low speed inner rotor, $\alpha$ is an angle of one of the rotors in a synchronously rotating reference frame, $\Pi_0$ is the zeroth coefficient of a Fourier series defining a permeance of the modulating ring, $\Pi_1$ is the first coefficient of the Fourier series defining the permeance of the modulating ring, $\mu_0$ is the permeability of vacuum, $M_H$ is the magnetomotive force associated to the high speed rotor magnet pieces and $M_L$ is the magnetomotive force associated to the low speed inner rotor magnet pieces;
  c. incorporating the determined combinations into the two stators and the two rotors; and
  d. integrating the induction machine with the magnetic gears to achieve the desired operating conditions.

5. The induction machine of claim 1 wherein the machine produces an asynchronous rotor motion at low speed and high torque density.

6. The induction machine of claim 3 wherein the machine produces an asynchronous rotor motion at low speed and high torque density with a grid connection or open loop control.

7. A use of the induction machine of claim 1 in systems comprising wind turbines, ship propulsion systems, actuation systems, electric vehicle systems, traction systems, drilling motors, crushers, wind generation systems, and oilfield equipment.

8. A use of the induction machine of claim 1 in equipment needing high-torque and low speed mechanical characteristics.

9. An induction machine with integrated magnetic gears, comprising:
  i) an outer stator defining stator slots and having a plurality of pole pairs, the outer stator comprising AC windings located in the stator slots, the AC windings being operationally connected to a power supply operating at a supply frequency, the outer stator for producing a rotating magnetic field synchronized with the supply frequency;
  ii) a high speed rotor positioned within the outer stator, the high speed rotor comprising rotor bars and permanent magnet pole pieces, a combination of rotor bars, pole pairs and permanent magnet pole pieces being configured for the permanent magnet pole pieces to not interact with the rotating magnetic field, a rotation of the high speed rotor being asynchronously coupled to the rotating magnetic field, the permanent magnet pole pieces of the high speed rotor generating a high speed rotor magnetic field;
  iii) an inner stator with ferromagnetic steel segments that modulate the high speed rotor magnetic field produced by the permanent magnet pole pieces of the high speed rotor; and
  iv) a low speed inner rotor comprising other permanent magnet pole pieces, the low speed inner rotor being configured to counter rotate with respect to the high speed rotor,
  the outer stator, the high speed rotor and the low speed inner rotor each comprising a respective ferromagnetic material,
  the high speed rotor, low speed inner rotor, outer stator and inner stator being arranged concentrically about a shaft;
  the low speed inner rotor being synchronously coupled to the high speed rotor using modulation harmonics; and
  a combination of the ferromagnetic segments, the permanent magnet pole pieces of the high speed rotor and the other permanent pole pieces on the low speed inner rotor providing a magnetic gearing between the high speed rotor and the low speed inner rotor.

10. The induction machine of claim 9 wherein the combination of rotor bar numbers, pole pairs and permanent magnet pole pieces, the other permanent poles pieces and the ferromagnetic steel segments are selected in accordance with an equation comprising:

$$\tau = \frac{p_L \pi r l g M_H \prod_o M_L \prod_1}{4\mu_o} \sin p_L \alpha$$

wherein $\tau$ is torque, r is the induction machine radius, l is the core length, g is the air gap length, $p_L$ is the number of permanent pole pieces of the low speed inner rotor, $\alpha$ is an angle of one of the rotors in a synchronously rotating reference frame, $\Pi_0$ is the zeroth coefficient of a Fourier series defining a permeance of the modulating ring, $\Pi_1$ is the first coefficient of the Fourier series defining the permeance of the modulating ring, $\mu_0$ is the permeability of vacuum, $M_H$ is the magnetomotive force associated to the high speed rotor magnet pieces and $M_L$ is the magnetomotive force associated to the low speed inner rotor magnet pieces.

11. A method of determining the number of ring pieces and machine dimensions for an induction machine integrated with magnetic gears, the induction machine having two stators and two rotors, the two rotors comprising a high speed rotor and a low speed rotor, the method comprising the steps of:
 a. providing speed and torque operating conditions for an induction machine integrated with magnetic gears; and,
 b. determining operational parameters for the two stators and two rotors in accordance with an equation comprising:

$$\tau = \frac{p_L \pi r l g M_H \prod_o M_L \prod_1}{4\mu_o} \sin p_L \alpha$$

wherein $\tau$ is torque, r is the machine radius, l is the core length, g is the air gap length, $p_L$ is the number of permanent pole pieces of the low speed inner rotor, $\alpha$ is an angle of one of the rotors in a synchronously rotating reference frame, $\Pi_0$ is the zeroth coefficient of a Fourier series defining a permeance of the modulating ring, $\Pi_1$ is the first coefficient of the Fourier series defining the permeance of the modulating ring, $\mu_0$ is the permeability of vacuum, $M_H$ is the magnetomotive force associated to the high speed rotor magnet pieces and $M_L$ is the magnetomotive force associated to the low speed inner rotor magnet pieces;
 wherein the operational parameters are a combination of rotor bar numbers, pole pairs and permanent magnet pole pieces, the other permanent pole pieces and the ferromagnetic steel segments.

12. A method of integrating an induction machine with magnetic gears, the induction machine having two stators and two rotors, the two rotors comprising a high speed rotor and a low speed rotor, the method comprising the steps of:
 a. determining the number of ring pieces and machine dimensions comprising:
  i. providing speed and torque operating conditions for an induction machine integrated with magnetic gear; and,
  ii. determining operational parameters for the two stators and two rotors in accordance with an equation comprising:

$$\tau = \frac{p_L \pi r l g M_H \prod_o M_L \prod_1}{4\mu_o} \sin p_L \alpha$$

wherein $\tau$ is torque, r is the machine radius, l is the core length, g is the air gap length, $p_L$ is the number of permanent pole pieces of the low speed rotors, $\alpha$ is an angle of one of the rotors in a synchronously rotating reference frame, $\Pi_0$ is the zeroth coefficient of a Fourier series defining a permeance of the modulating ring, $\Pi_1$ is the first coefficient of the Fourier series defining the permeance of the modulating ring, $\mu_0$ is the permeability of vacuum, $M_H$ is the magnetomotive force associated to the high speed rotor magnet pieces and $M_L$ is the magnetomotive force associated to the low speed inner rotor magnet pieces; and,
 b. integrating the induction machine with the magnetic gears using the operational parameters.

13. The induction machine of claim 9 wherein the machine operates at low speed with high torque density for producing asynchronous rotor motion.

14. The method of claim 11 wherein the speed and torque operating conditions are respectively, low speed and high torque density, for producing asynchronous rotor motion.

15. The method of claim 14 wherein the induction machine is coupled with a grid connection or open loop control.

16. The induction machine of claim 9 for use in systems comprising wind turbines, ship propulsion systems, actuation systems, electric vehicle systems, traction systems, drilling motors, crushers, wind generation systems, and oilfield equipment.

17. The induction machine of claim 9 for use in equipment needing high-torque and low speed mechanical characteristics.

* * * * *